US005732216A

United States Patent [19]

Logan et al.

[11] Patent Number: 5,732,216

[45] Date of Patent: Mar. 24, 1998

[54] AUDIO MESSAGE EXCHANGE SYSTEM

[75] Inventors: James Logan, Windham, N.H.; Daniel F. Goessling, Wayland; Charles G. Call, Hingham, both of Mass.

[73] Assignee: Internet Angles, Inc., Methuen, Mass.

[21] Appl. No.: 724,810

[22] Filed: Oct. 2, 1996

[51] Int. Cl.[6] ........................ H04N 1/42

[52] U.S. Cl. ........................ 395/200.33; 348/7; 348/13

[58] Field of Search ........................ 395/200.33, 200.49, 395/200.57, 200.58, 200.7, 200.72; 348/7, 10, 13, 14, 15

[56] References Cited

U.S. PATENT DOCUMENTS

| | | | |
|---|---|---|---|
| 4,456,789 | 6/1984 | Groves et al. | 379/202 |
| 5,195,086 | 3/1993 | Baumgartner et al. | 370/264 |
| 5,363,507 | 11/1994 | Nakayama et al. | 395/331 |
| 5,627,936 | 5/1997 | Prasad et al. | 386/96 |

*Primary Examiner*—James P. Trammell
*Assistant Examiner*—Thomas Peeso
*Attorney, Agent, or Firm*—Banner & Witcoff, Ltd.

[57] ABSTRACT

An audio program and message distribution system in which a host system organizes and transmits program segments to client subscriber locations. The hose organizes the program segments by subject matter and creates scheduled programming in accordance with preferences associated with each subscriber. Program segments are associated with descriptive subject matter segments, and the subject matter segments may be used to generate both text and audio cataloging presentations to enable the user to more easily identify and select desirable programming. A playback unit at the subscriber location reproduces the program segments received from the host and includes mechanisms for interactively navigating among the program segments. A usage log is compiled to record the subscriber's use of the provided program materials, to return data to the host for billing, to adaptively modify the subscriber's preferences based on actual usage, and to send subscriber-generated comments and requests to the host for processing. Voice input and control mechanisms included in the player allow the user to perform hands-free navigation of the program materials and to dictate comments and messages which are returned to the host for retransmission to other subscribers.

19 Claims, 7 Drawing Sheets

AUDIO MESSAGE EXCHANGE SYSTEM

FIELD OF THE INVENTION

This invention relates to an audio message data gathering and distribution system.

BACKGROUND OF THE INVENTION

The Internet provides a robust facility for exchanging information on diverse topics. The World Wide Web makes available a rich collection of data files which digitally record text, graphic, audio and video information. The Internet SMTP and POP protocols support the most widely used of all of Internet services, E-mail, and Internet Listserv and Usenet newsgroup services provide forums in which people having special interests can freely exchange information, normally in text form.

The Internet is also being increasingly used to send and receive audio information. Digitized, compressed, pre-recorded audio files may be downloaded from file servers to World Wide Web browsers running on computers having multimedia capabilities, typically using a "helper" programs to reproduce MIME (Multipurpose Internet Mail Extension) audio files for the listener,. Using suitable software, the Internet can also provide a digital communication pathway which permits two way telephone conversations between remotely located computers.

SUMMARY OF THE INVENTION

It is an object of the present invention to utilize the data transmission capabilities of the Internet, or another suitable data transmission facility, to distribute, collect and exchange information in the form of audio recordings.

In accordance with one aspect of the invention, the present invention takes the form of a communication system for distributing audio recordings among a plurality of participating subscribers, some of the recording consisting of pre-recorded programs and others being subscriber-generated comments, all of which may be classified by the topics to which they relate for distribution to other subscribers having an interest in the subject matter.

Each subscriber is preferably provided with a player/recorder unit capable of reproducing received audio recordings for a listener, and further capable of recording comments, annotations, messages, and responses to information requests imbedded in received recordings, the subscriber-generated recordings being returned to a central host facility for processing and redistribution to other subscribers.

By way of example, a given subscriber may indicate an interest in a group of specific topics and be provided with a program catalog identifying recorded programs which relate to those topics. While listening to program selected from this catalog, the subscriber may utilize the recorder to comment upon that program. The recorded comment is uploaded to the host along with identification data which designates the recording subscriber, the program segment being commented upon, and the position within that program segment when the comment was generated. Thereafter, the recorded comment may be transferred to other subscribers who request that program segment commented upon who, at their option, indicated a desire to listen to the comments made by other subscribers. Subscribers who listen to comments may, in turn, wish to add further comments to the program, or respond to or comment upon another subscribers comment.

A subscriber who records a comment may limit its transmission to the author or provider of the material commented upon, may make the comment a private note for the subscriber's sole use without transmitting it to anyone, or may choose to make it publicly available to any requesting subscriber. Publicly available comments may be listed in program catalog listings organized in accordance with subject matter categories assigned to the comment. A request for information on a particular topic may accordingly yield not only the program material originally provided by the host system on that topic, but also the comments of subscribers who share an interest in the topic.

The same facility used to generate public or private comments and annotations may also be used to enable a system subscriber to record and upload audio messages to identified subscribers or to the host system. This capability may in turn be used as a mechanism for providing help and support to subscribers concerning system operation, to provide free-form requests for desired programming which may be made generally available to subscribers, or to request specific information to be sent to the requesting subscriber on a fee basis.

Unlike Internet UseNet groups, which store and distribute text-based messages on particular special interest topics, the present invention utilizes audio recording and playback mechanisms to provide an interactive, conversational environment which eliminates the need to use a keyboard to interject comments and pose questions. Coupled with voice command responsive controls, the invention may be implemented as a hands-free system suitable for use by an automobile driver or other user's who cannot conveniently manipulate a keyboard to enter commands and data.

In accordance with a related aspect of the present invention, recorded audio programming sent to a listener may advantageously include imbedded requests for information formed by the combination of recorded audio prompts and request markers. The listener's player/recorder detects request markers to pause the playback while the listener dictates a response to the question contained in the audio prompt. Each recorded response is stored for future use along with identification data which designates the imbedded request and the program which holds the request. Combinations of such imbedded requests can be used to create an audio "fill-in-the-blanks" questionnaire that can be used to gather data from listeners, including survey data, program ratings, and the like. Subscribers who provide requested information may receive credit which reduces subscription charges or other incentives.

These and other objects, features and advantages of the present invention may be more completely understood by considering the following detailed description of a preferred embodiment of the invention. In the course of this description, reference will frequently be made to the attached drawings.

DESCRIPTION OF THE PREFERRED EMBODIMENT

Figure 1:
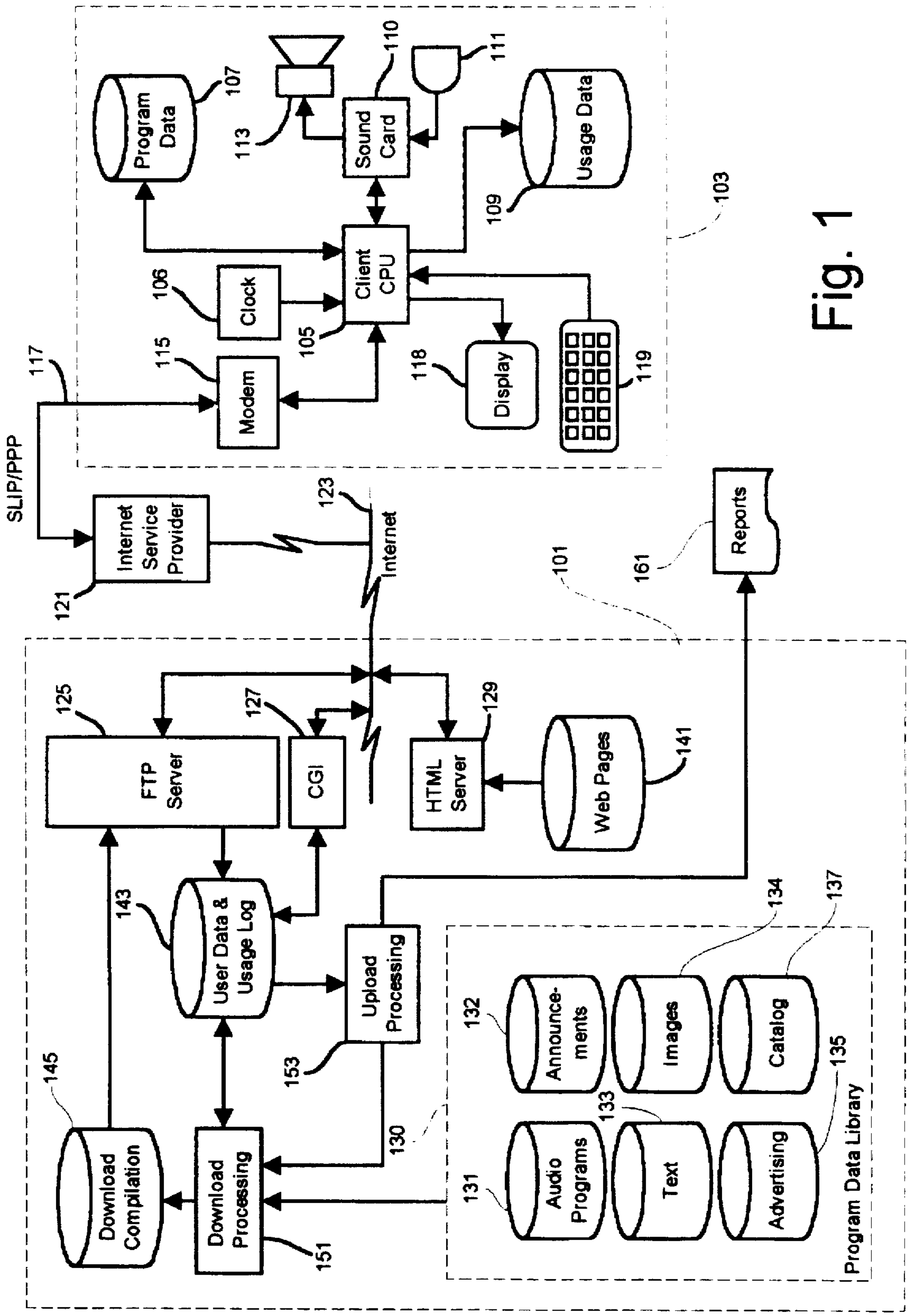
FIG. 1 is a block schematic diagram of an electronic program and advertising distribution system which embodies the invention.

The illustrative embodiment of the invention shown in FIG. 1 utilizes the Internet to provide communications between a host computer indicated generally at 101 and an audio player device illustrated at 103.

Subscriber Audio Player

The player 103 may be advantageously implemented by a conventional laptop or desktop personal computer including a processor (the client CPU 105), a time of day clock 106, and a data storage system consisting of both high speed RAM storage and a persistent mass storage device, such as a magnetic disk memory, the data storage system being used for storing audio, text and image data at 107 and for storing usage data at 109 which records the nature of the programming reproduced by the player 103. The player 103 further includes a sound card 110 which receives audio input from a microphone input device 111 for accepting voice dictation and commands from a user and which delivers audio output to a speaker 113 in order to supply audio information to the user. The program data stored at 107 may advantageously include compressed audio recordings and/or text (files of characters) which may be converted into audio form by conventional speech synthesis programs executed by the client CPU 105.

The sound card 110 is conventional and preferably complies with the recommendations detailed in the *Hardware Design Guide for Microsoft Windows* 95, by Doug Klopfenstein, Microsoft Press (1994), ISBN 1-55615-642-1. The sound card 110 advantageously supports a 44 kHz, 16-bit, stereo codec providing analog to digital conversion of audio input signals from the microphone 111 as well as digital to analog conversion for programming directed to the speaker 111. The sound card provides external connections and hardware support for Microphone-In, Line-In, Line-Out, and Headphones-Out, with volume controlled by the player software (including volume level logging as discussed later in connection with FIG. 3 of the drawings).

To support multimedia capabilities, the CPU 105 should meet or exceed the capabilities of an Intel 486 DX2-66 computer to provide consistently good playback results and the sound card 110 should include a 16-bit digital-to-analog converter for playback and a 16-bit analog-to-digital converter for recording. The sound card 110 should further support 8, 11, 22, and 44 kHz waveforms. A frequency of 44 kHz is used for CD-quality sound and fractions of 44, such as 11 and 22, are often used for compressed waveforms meant to save CPU processing. Support for an 8 kHz frequency should be in order to properly support Windows 95 TrueSpeech™ compression, which is optimized for compression and playback of human speech. Using TrueSpeech compression, programs containing largely voice narrative data can be substantially condensed, and users can record annotations and voice mail responses as discussed later.

In addition, the sound card 110 should be capable of reproducing downloaded MIDI (Musical Instrument Device Interface) commands, enabling the system take a MIDI data stream and produce sound according to the compressed files consisting of digital sheet music instructions. Preferably, the sound card should support at least 16-voice polyphony (the ability to play several sounds at the same time), and polymessage MIDI, an capability included in Windows 95 that allows a sound card to receive and batch-process multiple MIDI messages (such as Note On and Note Off). The sound card 110 should also a microphone port for microphone 111, a speaker-out port (for one or two (stereo) unpowered speakers 113, and a headphone-out port.

The personal computer CPU 105 is also preferably connected to a conventional personal computer video display 118 and a standard keyboard 119, as well as a pointing device (such as a mouse, trackball or touchpad, not shown). The facilities provided by the operating system, such as Windows 95, typically includes multimedia support, as noted above, as well as a standard WINSOCK TCP/IP stack and modem dial up driver software to support a SLIPP/PPP Internet connection, as next discussed.

The player 103 further includes a conventional high speed data modem 115 for receiving (downloading) the program information 107 from the remote server 101 and for transmitting (uploading) program selections and preferences as well as usage data in the file 109 to the server 101. To effect these file transfers, the modem 115 is connected via conventional dial up telephone SLIP or PPP TCP/IP series data communication link 117 to an Internet service provider 121 which provides access to the Internet. The service provider 121 is in turn connected to the host server 101 via a high speed Internet link seen at 123.

Host File Server

The host server 101 provides a FTP server interface 125 which provides file transfer protocol services to the player 103, a CGI interface 127 which performs Common Gateway Interface script program execution in response to requests from the player 103, and an HTML interface 129 which provides hypertext transport protocol (HTTP) World Wide Web server functions to the connected player 103. The host server 101 stores and maintains a plurality of data files including a program data library indicated generally at 130 consisting of a collection of compressed audio program segments 131, announcement ("glue") segments 132, text program segments 133, image segments 134, advertising segments 135 and program catalog information 137.

The compressed audio segments program segments comprise audio voice and music files which may be compressed using conventional compression mechanisms suited to the data being compressed, such as TrueSpeech compression for voice signals and MIDI files for compressed synthetic music reproducible by the sound card 110 as noted earlier.

Compressed voice programming in the database 131 may advantageously be accompanied by text transcripts (files of characters) stored in the text database 133. Similarly, images stored in the image database 134 may be used to provide a multimedia presentation which combines images reproduced on the display 118 of player 103 with concurrently presented audio at the speaker 113 and/or displayed text. Program segments which present advertising, illustratively shown as being resident in a separate database 135 in FIG.

1, may likewise consist of audio, text and/or image segments, as may the program segments which provide announcements between program segments as well as audible and visible menu options which the user may select as described later.

As hereinafter described in connection with FIG. 5, each voice or text program segment preferably includes a sequencing file which contains the identification of highlighted passages and hypertext anchors within the program content. This sequencing file may further contain references to image files and the start and ending offset locations in the audio presentation when each image display should begin and end. In this way, the image presentation may be synchronized with the audio programming to provide coherent multimedia programming.

As contemplated by the invention, information which is available in text form from news sources, libraries, etc. may be converted to compressed audio form either by human readers or by conventional speech synthesis. If speech synthesis is used, the conversion of text to speech is preferably performed at the client station 103 by the player. In this way, text information alone may be rapidly downloaded from the server 101 since it requires much less data than equivalent compressed audio files, and the downloaded text further provides the user with ready access to a transcript of voice presentations. In other cases, where it is important to capture the quality and authenticity of the original analog speech signals, a text transcript file which collaterally accompanies a compressed voice audio file may be stored in the database 133 from which a transcript may be made available to the user upon request.

The host server 101 further stores web page data 141 which is made available to the player 103 by means of the HTML interface 128. The host server 101 additionally stores and maintains a user data and usage log database indicated at 143 which stores uploaded usage data received from the store 109 in the player 103 via the Internet pathway 123 and the FTP server interface 125. The user data 143 further contains additional data describing the preferences, demographic characteristics and program selections unique to each subscriber which is developed largely from user-supplied data obtained when users submit HTML form data via the Internet pathway 123 for processing by the CGI mechanism 127.

The host server 101 periodically transmits a download compilation file 145 upon receiving a request from the player 103. The file 145 is placed in a predetermined FTP download file directory and assigned a filename known to the player 103. At a time determined by player 103 monitoring the time of day clock 106, a dial up connection is established via the service provider 121 and the Internet to the FTP server 125 and the download compilation 145 is transferred to the program data store 107 in the player 103. The compilation 145 is previously written to the download directory by a download processing mechanism seen at 151 in the server 101. Download processing, as described in more detail later, extracts from the library 130 data defining compressed program, advertising, and glue segments, and/or associated text program data, based on selections and preferences made by (or inferred for) the user as specified in the subscriber data and usage log database 143.

The download compilation file 145, though represented as a single file in FIG. 1, preferably takes the form of one or more subscriber and session specific files which contain the identification of separately stored sharable files. By way of example, the recommended order and the identification of the program files making up an individual playback session are stored in a session schedule file (to be described in detail in connection with FIG. 5) which contains program identifiers of the program segments to be played during an upcoming session. The player 103 downloads the session schedule file and then issues download requests for those identified program segment files which are not already available in the player's local storage unit 107.

Usage data in the store 109 maintained by the player 103 is preferably uploaded as a file bearing a predetermined file name indicative of the particular subscriber and upload time and stored in a predetermined FTP upload directory. This upload advantageously occurs'at the same time the player 103 establishes a download connection to the FTP server 125 as noted earlier, and occurs prior to the download of the compilation 145. Because the upload data from the store 109 in the player 103 identifies program segments desired by the subscriber, program segments newly requested by the user are appended to the compilation 145. Note that, in typical cases, programming in addition to the specifically requested programming will be included in the download compilation, and the transfer of that programming can begin immediately while the newly uploaded user selections and other information are being processed as indicated at 153 to identify additional information to be included in the download compilation.

As indicated at 161 in FIG. 1, the host server upload processing mechanism 153 also provides a number of reports, as described in more detail later, based upon the record of actual player use by individual subscribers and the community of subscribers as a whole. This report processing is advantageously performed on a periodic basis in connection with financial and accounting functions including subscriber and advertiser billing, content provider royalty payment accounting, and marketing analysis processing.

It should be understood that numerous other information storage, processing and communications schemes may be substituted for the preferred Internet server and PC client player architecture shown in FIG. 1. A dedicated host computer which communicates directly with client stations via dial up telephone facilities may be used, and cellular radio, cable modem and satellite links may be used to provide data communications in lieu of the conventional SLIP/PPP telephone and Internet links shown in FIG. 1. To facilitate use of the system in an automobile, a "player" computer may be linked to the Internet via a local communications server computer via a radio or infrared link when the car is parked at the subscriber's home or office. The infrared Data Association's (IrDA) wireless infrared (IR) standard provides a highly effective, low-cost communications pathway rapidly becoming a standard feature in all notebook computers and PDAs. The IrDA international standard provides interoperability among widely diverse systems, involves no governmental regulation, are provided at low cost, provide high speed file transfers (e.g., 4 Mbs data rates), are small and can be easily incorporated into portable computers of the type which may be used in a car or on public transportation. Alternatively, the files downloaded from the host may be stored on a replaceable media, such as an optical disk cartridge, which may then be inserted into a portable computer or simplified player for mobile use. A direct link between a mobile client player (such as a laptop PC) may be implemented using the Cellular Digital Packet Data (CDPD) service presently available in major metropolitan areas to provide low-cost access to the Internet using the TCP/IP protocol, and provides the advantage that needed program segments can be downloaded while a session is in progress, eliminating the need for a complete download before the mobile unit is disconnected from its data source.

Upload and Download Sequence—Overview

Figure 2:
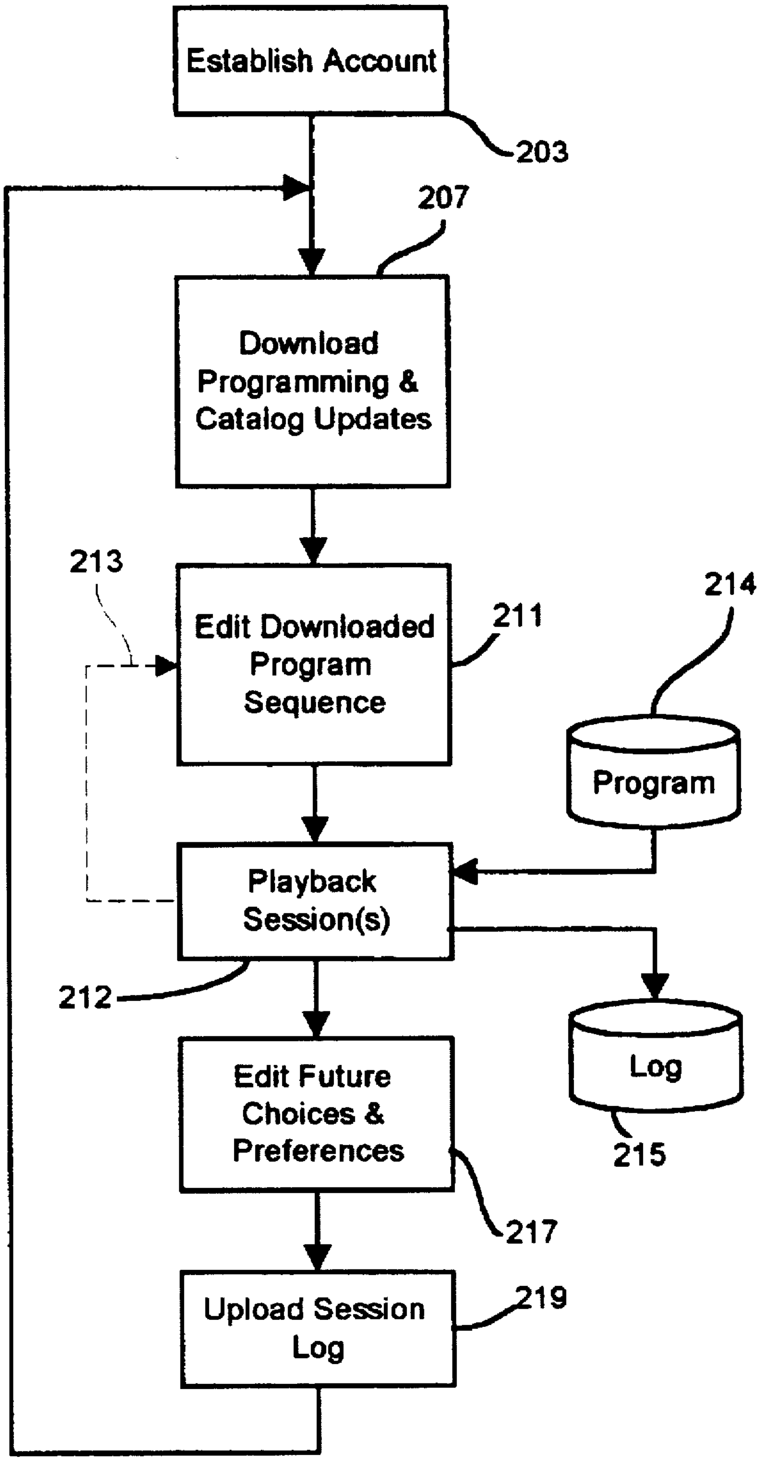
FIG. 2 is a flow chart illustrating the principle steps followed in the course of the performing the information distribution functions contemplated by the invention.

FIG. 2 illustrates the sequence of major events which are executed the program dissemination system contemplated by the invention.

As indicated at 203, an interested subscriber invokes programming services by first supplying personal information and initial programming preferences during an account initialization procedure. Preferably, as explained in more detail later, account initialization is accomplished by presenting the subscriber with HTML forms to complete and submit to CGC script programs which execute on the server to post subscriber supplied information into an initial user dataset. Based on the information supplied by the user, the server then compiles one or more files for downloading to the subscriber at step 207 which include programming and advertising segments as well as additional data and utility programs needed by the player 103 to begin operation. The download operation preferably occurs at a time established by the player which establishes a dial up connection via the SLIP/PPP serial connection 117 to the local Internet service provider 121 which provides an Internet connection to the host FTP server 125. The download file or files containing programming and advertising segments as well as subscriber specific data are designate by filenames provided by the requesting client/player 103 and moved from storage unit 145 utilizing the FTP server 125 and the Internet connection into local storage at 107 in the client/player 103. The filenames used to specify the files in the server 125 may conveniently be formed from the program_id value used internally by both the host and the player to identify and differentiate the different program segments used.

The data downloaded includes a recommended program sequence file which provisionally identifies the order in which downloaded program segments are to be played, with the initial selection and sequence being established based on user preference data by the download compilation processing mechanism seen at 151 at the server.

Before a playback session begins, as indicated at 211, the subscriber has the opportunity to review and alter the provisional program selections and sequence established as a default by the downloaded information from the server. Utilizing the programming data and a utility program previously supplied by the server, the subscriber may alter the selection and sequence of program materials to be played, including altering the extent to which advertising will be played along with the selected programming.

At the request of the user, the sequence of programming defined by the program sequence file (the selections file illustrated at 351 in FIG. 5) is then reproduced for the listener. As contemplated by the invention, the player 103 includes controls which enable the user to easily move from program segment to program segment, skipping segments in a forward or reverse direction, or to jump to a particular segment, and thus alter the preprogrammed sequence. Nevertheless, when any given program segment concludes, the next segment which is specified as following the given segment will begin playing unless the listener intervenes. Thus, although the segments are stored in randomly addressable locations in the local mass storage unit, they are nonetheless played at step 212 in the sequence established initially by the server and (optionally) modified by the subscriber, with the player providing the ability to dynamically switch to any position in this sequence under the listeners control. As indicated at 213 in FIG. 2, the listener may at any time return to the sequence editing step 211 to manually reorder the playing sequence if desired. As indicated at 215, a session usage log is recorded during the playback session to identify every segment actually played, the volume and speed at which that segment was played, and the start and end times.

At step 211, in addition to deleting and reordering items on the program schedule, the user may alter his or her selections and general subject matter preferences to control the manner in which the host assembles program schedules for future sessions. When programs are included in a current schedule which are of particular interest, the subscriber may assign a priority value to the scheduled program and, in that way, inform the host that the user has an interest in receiving more programing in the same subject matter categories in which the identified program is classified. When a program in a serialized sequence is assigned a new or different priority value at step 211, the host system 101 assigns a corresponding Importance value to the program_segment record for each of the remaining unplayed programs in that serialized sequence. Note that, by expressly approving advertising segments or categories of acceptable advertising in this fashion, the subscriber may be granted a rate reduction since advertisers are generally willing to pay more for advertising directed to customers having a known interest in a given subject.

At the conclusion of a session, subscriber is given the opportunity at 217 to select programming which should be included in the next programming download. To facilitate this selection process, additional programming which fits the subscriber's indicated subject matter preferences, along with additional programming which the server includes as being of particular interest, is identified in a catalog (as periodically supplemented by a download file seen at 308 in FIG. 4) and presented to the user in the form of a proposed program schedule together with a catalog of additional selections which may be substituted or inserted into the proposed schedule. At step 219, the selections made by the user at 217 as well as the contents of the usage log recorded at 215 are uploaded to the server as a requested file (seen at 301 in FIG. 4). This upload step may occur at the same time the SLIP/PPP dial-up connection is established by the player 103 to accomplish the download, with the upload occurring first by an FTP file transfer from the usage data store 107 to the FTP server 125 followed by the downloading of files requested by the client 103 from the FTP server.

In addition to the downloaded catalog of available items which may be viewed by the subscriber from the available downloaded information, the user may re-establish an Internet connection to the HTML web server 129 which presents HTML program selection and search request forms, enabling the subscriber to locate remotely stored programming which may be of particular interest to the subscriber. When such programs are selected in the HTML session, the user's additional preferences and selections may be posted into the user data file 143 and the identification of the needed files may be passed to the client/player 103 for inclusion in the next download request.

Account Initialization

As contemplated by the invention, a subscriber account may be established by any user having a personal computer equipped to provide the capabilities needed to implement the player 103 as described above, together with Internet access via a service provider 121. Although a conventional modem dial up connections will perform satisfactorily, the time required for uploading and downloading the necessary files may be substantially reduced using higher speed access, such as an ISDN or cable modem link, when those services are available.

To establish a new account, a prospective subscriber may use a conventional web browser program, such as Mosaic, Netscape Navigator or Microsoft's Internet Explorer, which executes in the client CPU 105 to establish a conventional HTTP request/response dialog with server 101. The account initialization begins with the transmission of an HTML form from the web page store 141 which is completed by the user at the keyboard (not shown) of the client CPU 105. The account information is then transmitted to using a HTTP post method directed at a form processing CGI script executed by the server at 127 to place descriptive information about the user in an assigned user data file as seen at 143. After the account has been established, utility programs and data may be downloaded from the FTP server 125 to the client/player 103. These utility programs advantageously include programs which perform functions including (a) program decompression, playback and navigation; (b) recording of a usage log file identifying the program and advertising segments played and the start time, ending time, volume level and playing speed for each s(c) segment; and (c) the selection and updating of programming preferences and selections for future downloading.

The data fields supplied by a new subscriber at the initialization step 203 may advantageously include the user's full name and billing address, credit card information or the like for use in subscriber billing; and descriptive data about the subscriber (and others who may share the downloaded material), such as: age, profession, sex, and marital status; the identification of subject matter categories of interest to the subscriber, preferably with assigned weighting factors indicating the level of interest in each category. The subscriber may also indicate general preferences with respect to the including advertising, including an indication of the amount of advertising which is acceptable to defray subscription costs, ranging from fully advertised programming for minimum subscription charges to the complete exclusion of advertising.

In addition, the subscriber may request and be presented with an HTML form which lists available programs in a particular selected subject matter area, with a priority weighting factor pre-assigned to each in accordance with the subscriber's previous specification for that category. The form presented thus reflects the previously entered level of interest weighting factor for each program based on its subject matter category, but permits the subscriber to override the suggested default value on a program by program basis. Similarly, the subscriber is given the opportunity to override the default amount of advertising desired.

Advertising may be associated with particular subject matter categories as well as with particular programs. For example, an airline may wish to advertise generally in connection with programming in the "travel" category whereas a particular resort hotel may wish to advertise only in connection with a particular travelogue program for the region where it is located. Subscribers may wish to hear advertising in connection with the programming in the travel category, but to eliminate commercials from a daily program presenting "today's weather report." The result is clearly advantageous for the advertiser, since advertising is focused more clearly on those having an interest in the subject matter and an expressed willingness to listen to commercial messages, while the subscriber is able to receive advertising which may be regarded as useful while eliminating unwanted advertising.

Because personal data describing each subscriber's subject matter interests is available, along with personal data (age, marital status, zip code, etc.), particular advertising segments may be directed to only those subscribers having a likely interest in the goods or services advertised. This targeted advertising need not be presented at any time during the playback for the designated subscriber and need not be timed for presentation with particular programs. For example, a subscriber indicating an interest in travel programming may be supplied with advertising from an airline at any time, and not necessarily concurrent with selected travel programming.

Because a subscriber may have a particular interest in or enjoy some advertising, and may have a particular dislike for other specific advertising, the user may advantageously be presented with a listing of advertising organized by advertiser and subject, providing the subscriber with the opportunity to select additional desired advertising on the list while suppressing others. Since the voluntary acceptance of advertising preferably reduces the programming charge to the subscriber, the utility program which executes on the client CPU 105 to enable program and advertising selection, sequencing and editing preferably provides an advisory indication to the subscriber of the charges or credits to be accrued if the currently programmed sequence is played. This feature enables subscribers to better control the costs of the service by accepting sufficient advertising content to reduce the subscription cost to an acceptable level. Subscribers may also set a player system variable to a value indicating the subscription costs per unit time that the subscriber is willing to accept, and the player 103 can then automatically insert advertising segments between program segments in sufficient quantity to achieve a net charge at the desired level.

Player Operation

Figure 3:
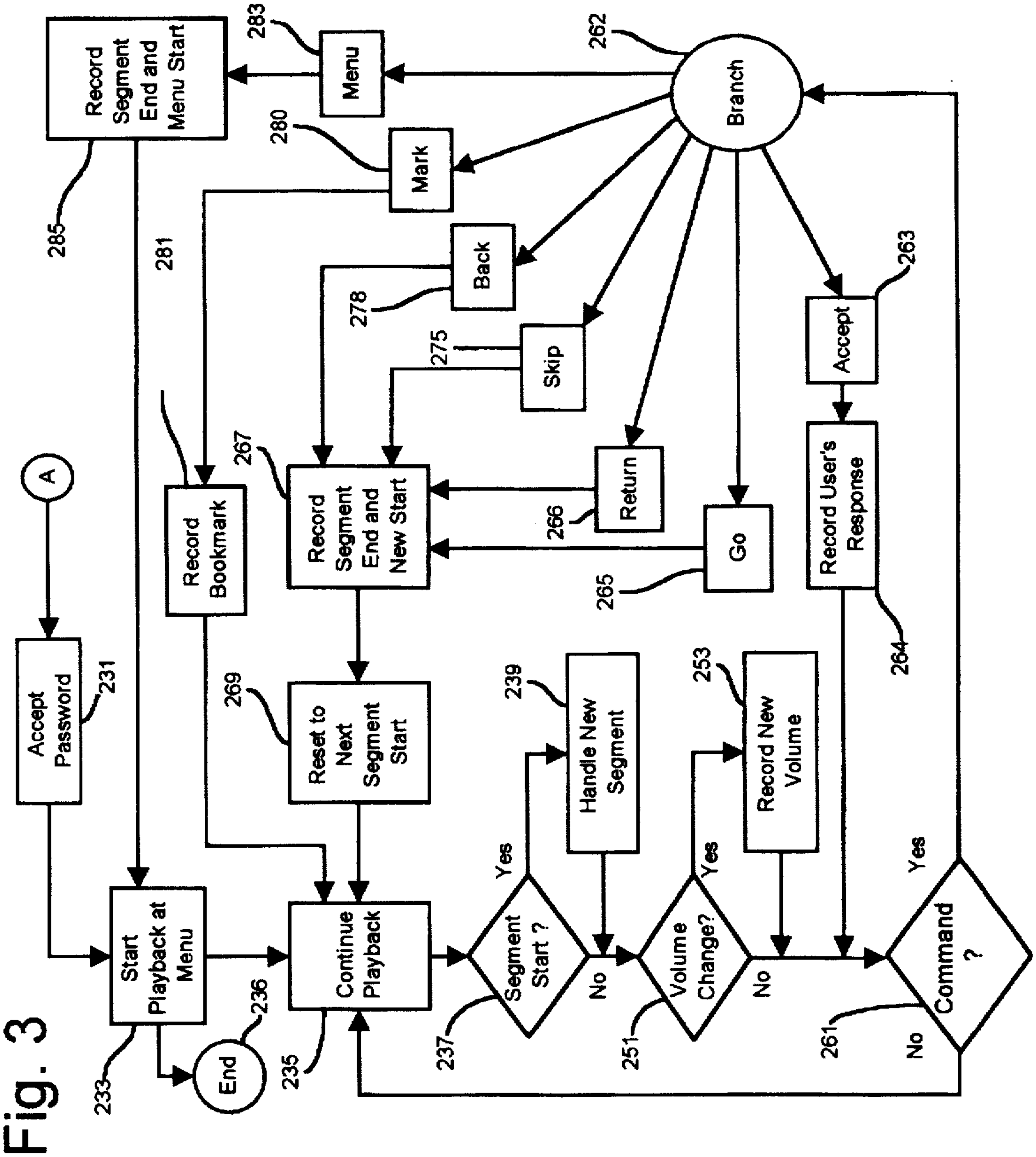
FIG. 3 is a flow chart illustrating the principle steps performed during a playback session in the illustrative embodiment.

The playback operation indicted generally at 212 in FIG. 2 is illustrated in more detail in FIG. 3.

In order to limit access to the downloaded programming materials to the subscriber or persons authorized by the subscriber, the playback utility program executing on the client CPU 105 (FIG. 1) advantageously begins the session by requesting the entry of a password as indicated at 231. The entry of this or a different password may also be required for access to the utility programs used to modify the subscriber's personal data, future program selections, and current program selections and sequencing. Similarly, information which might be revealed concerning an individual subscriber by the host server 101 is advantageously password protected.

As with all Internet transactions, the actual data transmissions of information other than publicly available programming may also be encrypted. To this end, the client and server ends of the pathway may exchange public keys to enable encrypted transmission using conventional RSA encryption. By placing the decryption capability within the capability of the playback unit which is capable of directing decrypted content only to the system's speakers and display screen, but not to a file, the system insures that the internal usage accounting mechanism cannot be bypassed by reproducing downloaded program segments using other means. In addition, and as a part of this secure accounting arrangement, the host system can be programmed to require the receipt of an uploaded usage log (from which subscriber and advertising charges and content provider payments can be determined) before releasing additional programming materials for downloading from the FTP server 125.

As described in more detail later in connection with FIGS. 4 and 5, the sequence of program segments to be presented to the user is formed into a schedule file (seen at 307 in FIG. 4) consisting of a sequence of program segment identification numbers which are used to compile a sequencing file, called the selections file, illustrated at 351 in FIG. 5, which contains more detailed information about the sequence of events which occur during playback. The player obtains information from the selections file which identifies the individual program segments to be fetched from mass storage and played for the user, as well as the segment identification information which is recorded in a usage logging file in the manner illustrated in FIG. 3.

As indicated at 233, the playback session begins with the presentation of an audio (and/or displayed) menu which allows the user to jump to any program segment within that sequence to start (or resume) playback at 235, or terminate the session at 236.

The playback operation itself continues from the designated playback point in the selections file (seen at 351 in FIG. 5) which follows a program sequence initially created by the host server and downloaded with the program segments themselves, and then (optionally) modified by the addition, deletion and resequencing of segment identifiers as discussed earlier in connection with step 211 in FIG. 2. Note however that, if the user elects to have advertising segments automatically inserted between program segments to achieve a predetermined cost level, that insertion occurs under the control of the playback mechanism at 235 such that advertising segments not identified in the selections file may be added or advertising segments specified in the selections file may be automatically skipped.

As playing progresses, the current playback position may be advantageously indicated by a variety of means. In the most simple form, the current playback position within the session file of selections (discussed in more detail in connection with FIG. 5) may be indicated by a simple numerical readout indicating the position on a scale of 1–100. In this way, a user listening to the programming in scheduled order is provided with an indication of the duration of programming remaining to be played. In a player implemented by a personal computer provided with a screen display, the current playback position may be advantageously indicated by displaying the program segment topic descriptions in a scrolling listing, with the description of the program currently being displayed being highlighted. The scheduled duration of each program segment may be displayed, along with the elapsed time remaining to be played in the currently playing segment, to enable the user to more easily determine when to skip the remainder of the currently playing segment. When such a concurrent visual display is available, means may also be included to respond to the users selection of a given program on the scrollable listing by means of a mouse or the like, and then automatically continue the play at the beginning of the program segment thus selected.

Each time the playback begins a new programming, advertising or announcement segment, the segment start time is recorded in the usage log file stored at 109 (FIG. 1). Each usage log record contains a program segment identification number (ProgramID) obtained from the selections file as well as a start time and date stamp encoded into a 32 bit date-time value, a volume level setting indicating the volume at which the player was set at that time, and a playing speed value indicating the playing speed or playing being used.

As indicated at 237 in FIG. 3, each time a new program segment is started, a new segment handling procedure is executed at 239. If the user desires to have advertising inserted to defray the costs of the subscription, the current actual cost per unit time is calculated and compared with the desired cost per unit time. If the cost is determined to exceed the desired level, an additional advertising segment is started; otherwise, the next program segment in the program sequence 214 is played. In either case, the segment id of the newly starting segment is recorded in the log file along with the start time for that segment. Note that it is unnecessary to record the end time for the prior segment since it is the same value as the start time for the next segment. When play is concluded, a terminating record indicating the time of turn-off is recorded to enable the duration of the last segment to be calculated.

Recording Volume and Playing Speed Changes

As indicated at 251, if the user changes the volume level or playback speed by a significant amount, a new record is posted to the usage log at 253, indicating the continuation of the last program at a new volume level (thus producing two records in sequence having the same program segment ID numbers but having differing start times and volume levels). The user adjusts the volume by means of a software control displayed when the player is active. The user adjusts the control using the mouse or keyboard to adjust the volume. When the volume control experiences a change in level greater than a predetermined deviation, it sends a message to the player routine at 251 to cause the new volume level to be recorded at 253. New volume settings do not affect the program sequence and the recording of the volume level change takes place transparently to the user. Likewise, when the user changes the playing speed, or switches to highlight mode, the new playing speed setting is recorded (using the PlayingSpeed variable in a Usage Record, to be discussed).

The cost accounting program which calculates subscriber charges and fees to advertisers may thereby treat volume levels below a predetermined threshold level, or playing speeds in excess of a certain level, as being equivalent to skipped programming. In addition, if a subscriber reduces the volume on selected programs or programs in particular subject matter categories, frequently increases the volume for other programs or subject matter categories, or sets the playing speed to play highlights only of other programs, that data can be used to infer preferences and dislikes which can be used to better select desired programming to be included in future download compilations.

User Playback Controls

The player mechanism seen at 103 includes both a keyboard and a microphone for accepting keyed or voice commands respectively which control the playback mechanism. As indicated at 261, the receipt of a command, which may interrupt the playback of the current selection, and the character of the command is evaluated at 262 to select one of six different types of functions.

The player 103 responds to the first command, "Accept" indicated at 263, by temporarily suspending the playback in order to accept a spoken "comment" from the user which is recorded as indicated at 264. After the conclusion of the comment, control is returned to 261 to test for additional commands before playback is resumed at 235. As described in more detail later, comments dictated by the user are saved and later uploaded to the host system where they exist as program_segments. By allowing the user to dictate and record comments, the system provides a number of useful capabilities, including posting comments and messages to the host (requests for help or additional information), posting comments and messages either privately or publicly to the originator of a program segment being played, thereby enabling private interchanges to occur between users, to enable the interchanges to take place in publicly available threads analogous to the UseNet and Listserv newsgroups employed on the Internet to facilitate public discussions related to predetermined topics. In addition, the ability to accept and upload user-generated comments and information provides a valuable mechanism by which the user can evaluate and comment on the program material being provided by the host. As described later in connection with FIGS. 5 and 7, the mechanism seen at 263 and 264 for introducing a pause in the session playback while a voice response or comment from the user is recorded can also be employed to produce program generated prompts which request information followed by automatic response recordings, thereby enabling the system to be used to collect data, program evaluations, and other information from the user.**

A first command, "Go" indicated at 265, causes the player to make an immediate shift to a different program segment. For example, the spoken voice command "FIVE" can indicate a request to go to a predetermined numbered program segment while the spoken command "NEWS" could switch to the subject announcement segment for news programs. Alternatively, a mouse click on a screen-displayed menu of items, or a push-button on a hand controller connected by an infrared link to the player computer, could similarly be processed as a command to go to a predetermined program segment associated with that command signal. In such cases, the system records the start of the new segment on the log file (seen at 215 in FIG. 2) at 267 and switches the current playback position in the program sequence file 214 to the new setting at 269, and the playback continues at 235.

Figure 5:
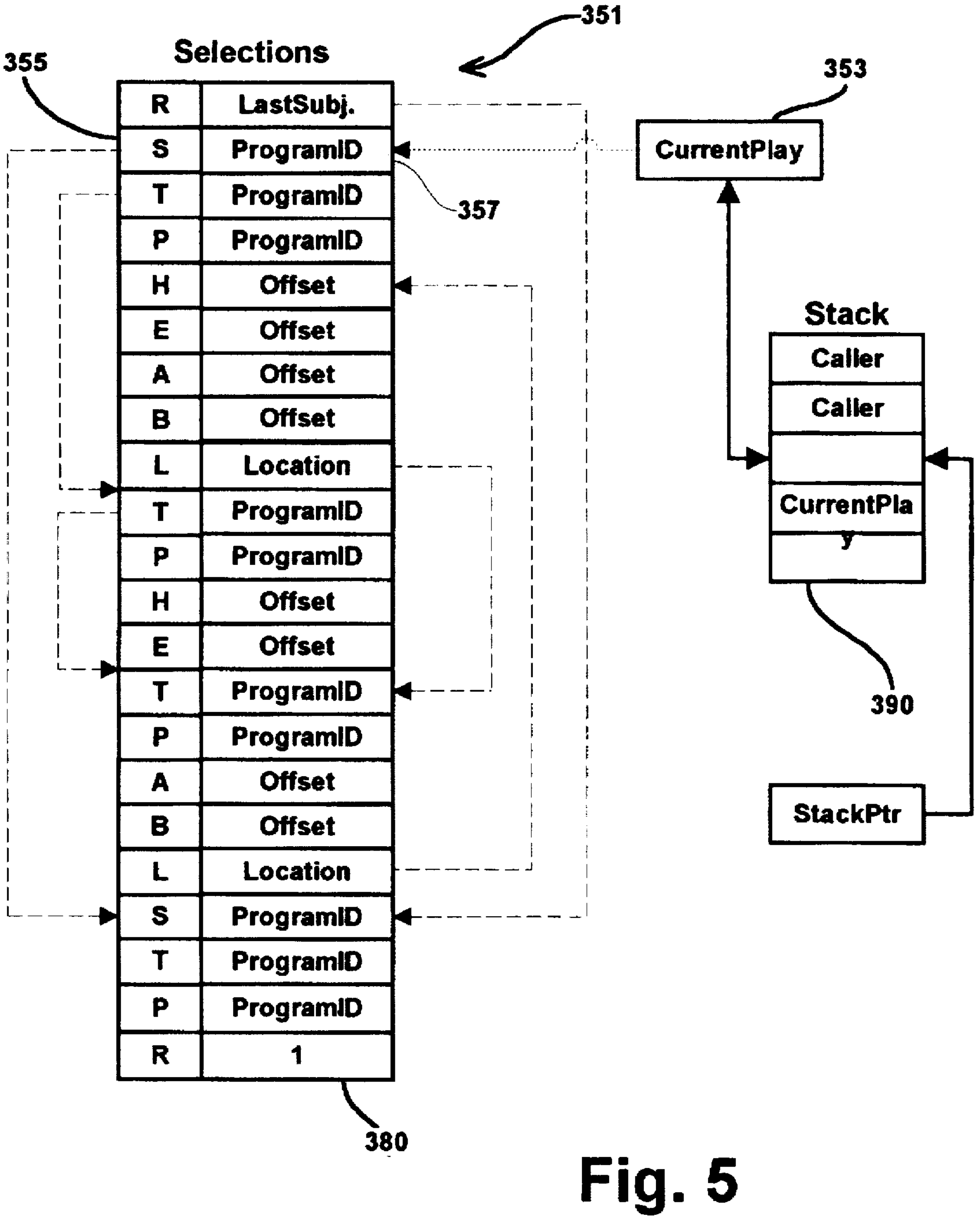
FIG. 5 is an information structure diagram illustrating the manner in which the program segments are dynamically selected and played in response to the user's preferences and control decisions.

In the preferred arrangement, described in more detail in conjunction with FIG. 5 of the drawings, the program being played may contain passages which relate to other program segments in the compilation. These passages may be indicated by direct announcement, such as: "Say 'Go' when any of the following automotive companies are named to obtain additional information: . . . Ford . . . General Motors . . . Chrysler . . . Honda . . . ." Alternatively, an audible cue signal, such a distinctive tone or chime, might immediately precede a passage which anchors a link to another program segment. Players equipped with stereo audio output capabilities can make cues distinctive by playing cued announcements in one stereo channel, with or without a supplemental cue signal in the other channel. When a cue signal indicates a hyperlink passage, a simple "Go" voice command causes the player to reset to a new location from which playing continues until a "Return" command, seen at 266, causes the player to return to the original sequence.

As discussed later in connection with FIG. 5, hyperlinks of this type may be used to identify program segments which are not available in the player 103 because they were not downloaded for inclusion in a scheduled session. In that event, the "Go" handling routine seen at 265 posts a record to the usage log containing the ProgramID of the requested but unavailable segment so that the requested segment can be included in the Requested file 301 seen at 301 in FIG. 4.

When a communications pathway such as an Internet or cellular phone link is available to connect the player 103 to the server, an immediate request may be sent to the server to download a needed but locally unavailable segment. In that case, the downloading and playing may proceed concurrently by placing the downloaded information into a memory buffer to which the downloaded program segment is written as it is concurrently read for reproduction as described U.S. Pat. No. 5,371,551 issued to James Logan and Daniel F. Goessling. To eliminate breaks in the program sequence, the player 103 may advantageously perform a look-ahead operation, sending a file request to the file server via the communication link by pre-scanning the program sequence file 214 to identify program segments to be played which are not in local storage and requesting those segments before they are needed.

Because announcement or "glue" segments are frequently repeated in different program segments, these segments are preferably retained in local storage by the player to avoid the need to be downloaded. The player advantageously processes the usage file at the end of each session and tags each program segment which has been played as being eligible for replacement to make room when necessary for incoming segments. Announcement segments, however, are preferentially retained even though they have been played because of the higher probability they may again be included in upcoming session schedules.

The third command, the SKIP command indicated at 275 in FIG. 3, causes the player to advance to the beginning of the next program segment in the program sequence, recording the start of the next sequence at 267 and resetting the playback position at 269. If the program segement has been subdivided (e.g. into paragraphs), the SKIP command causes the player to skip forward to beginning of the next subdivision within that segment. If desired, SKIP commands may be subdivided into two types, a SKIP TOPIC command and a SKIP SUBJECT command. When programming material such as news reports are grouped into topics within subject categories, as described later in connection with FIG. 5, a SKIP SUBJECT command allows the user to skip over all program segments within that subject and resume playback at the leading description of the next subject. In contrast, the SKIP TOPIC command always advances to the next topic (program segment or program segment subdivision) in the sequence. If desired, the SKIP TOPIC command can produce a jump to the next program segment or subdivision which does not contain advertising, making it unnecessary for the listener to listen to advertising while scanning the program sequence for the next desired program segment.

The BACK command indicated at 278 operates like the SKIP command but in the reverse ("rewind") direction. Similarly, the BACK command may be subdivided into two commands, a BACK SEGMENT and a BACK SUBJECT command, which respectively reset the playback point to the beginning of the prior segment or the beginning of the prior subject description. Note that, after any given segment has played for a predetermined amount of time, the BACK command should reset the playback to be beginning of the current segment or topic respectively, allowing the user to start the current segment or topic from the beginning unless the playback point is already near the beginning, in which case the transition is made to the prior segment. The system responds to BACK commands by resetting the playback point to the desired point in the sequence and recording the start time, volume setting and new program segment ID in the log file as indicated at 267.

In the preferred form of the invention described in more detail in connection with FIG. 5, the context sensitive SKIP and BACK commands are used instead of the SKIP TOPIC, SKIP SUBJECT, BACK TOPIC and BACK SUBJECT commands discussed above. In the preferred arrangement, the program materials include subject and topic announcement program segments in addition to the program segments (both programming and advertising). When the user issues a SKIP or BACK command while the player is playing a subject or topic announcement, the player skips the entire subject or topic being announced and moves to the next subject or topic announcement respectively, automatically bypassing the intervening program segments which comprise the skipped subject or topic.

The fifth command, a "MARK" command at 280, is used to place a "bookmark" into the usage log which identifies a program segment, or a portion of a program segment, which the listener wishes to designate for future use. In its simplest form, the bookmark recording function indicated at 281 may simply record a bookmark and the Program_ID of the current program segment into log file. By bookmarking a program segment, that segment may be recalled by the subscriber and all or part of it saved for later use in local storage, from which it may be reproduced, forwarded as an attachment to an email message, and the like.

More elaborate bookmark functions which may be readily incorporated into the system if desired include the following:

- Dictating or keyboarding an annotation at a predetermined position in the bookmarked program segment, the annotation being saved in local storage so that, when the bookmarked program segment is reproduced, it will include the annotation. The bookmarked program segment and the annotation may then be saved as a unit for future reference or forwarded to another person.
- Bookmarked program segments, or annotations to bookmarked program segments, may be used in conjunction as an auxiliary audio voice mail and email handling system in which a subscriber's email and voice mail items are organized as topics in the playback session, enabling the subscriber to bookmark particular incoming messages (program segments) for further attention, or to dictate voice mail responses, or responses that can be converted to text form by a human typist or by a voice recognition system. This aspect of the present invention allows the subscriber to review and respond to incoming email and voice mail messages while commuting or traveling to more productively utilize travel time. Voice annotations may be stored in separate files which are uploaded to the host with the usage file and keyed to the program segment passages which they annotate by records in the usage log file.

The sixth command type, the "MENU" command indicated at 283 in FIG. 3 switches the player to a predetermined menu program segment, records the start of a menu mode state in the log file at 285 and places the player in the menu mode at 233. Using a hands free voice command system, the player may reproduce a menu program segment in which a sequence of options are enunciated on the system's audio output speaker with short pauses between the recited options. By providing the voice command "Go" during or shortly after a desired option, the user may cause the system to branch to that selection. Menu options of this type may be conveniently implemented using the hyperlink capability described later in connection with FIG. 5. Alternatively, as noted earlier, the menu of options may be displayed on the screen with the desired playback point being selected using the keyboard or a pointing device. In all cases, each transition to a new program segment is recorded into the usage log for later uploading to the server and subsequent processing.

Program Compilation & Billing

Figure 4:
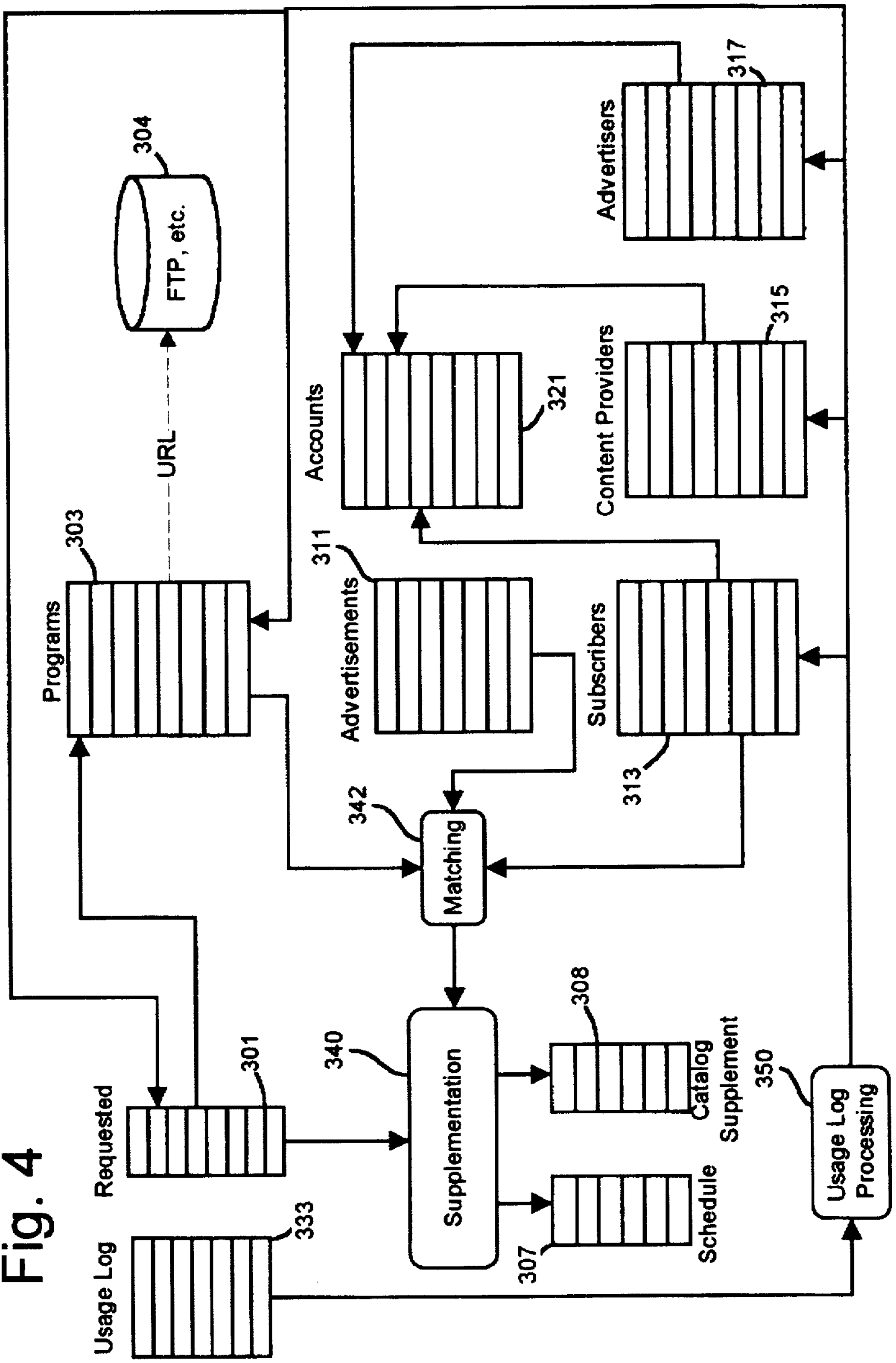
FIG. 4 is an information structure and data flow diagram illustrating the manner in which programming is selected and accounting functions are performed in the illustrative embodiment of the invention.

FIG. 4 illustrates the principle data processing steps and information structures employed by the preferred embodiment of the invention to compile programming information personalized to the preferences of individual subscribers, to perform accounting functions which produce billing charges to subscribers and advertisers, and to determine royalty payments due to content providers.

The program, advertising and announcement segments to be made available to an individual subscriber include those program selections which the subscriber chooses from the supplied catalog of recommended programs, or additional selections chosen during a dial-up dialog with the host, as described above in connection with step 217 seen in FIG. 2. The selections made by and uploaded from the subscriber take the form of a file (sequence) of 32 bit integers, each integer (ProgramID) designating a particular program segment. This file of integers is placed in a relational database Requested Table seen at 301 in FIG. 4, with each row (record) in the Requested Table being an identification number which specifies a corresponding record (row) in a database table 303 called the Programs Table. The Requested Table 301 includes not only express requests from the user based on catalog selections but also requests which result from failed hyperlink requests which occur when the listener requested hyperlinked information during the session which was unavailable in local storage at the player. The program segments (which include programs, advertising and announcements) have a plurality of attributes which are described in the data fields of each record (row) in the Program Table 303. The following Pascal type declarations define the content of each record in the Programs Table 303:

```
Type
  Classtype = (advertisement, program, announcement);
  Program_Segment = record
      ProgramID: integer; { unique key }
      ProviderID: integer;
      Class: Classtype;
      URL: pchar;
      Created: datetime;
      SubjectDesc: integer;
      TopicDesc: integer;
      GroupID, Episode: integer;
      CommentOn: integer;
      Subjects: array[0..15] of integer;
      Importance: array[0..15] of integer;
      Youngest, Oldest, male, female: byte;
      HouseLow, HouseHigh: byte;
      Duration: integer;
      Plays: integer;
      TotalTime: double;
      PlaysRate, TimeRate: integer;
      Timeliness: integer;
    end;
```

Each Program_Segment record in the Programs Table 303 is identified by a unique key integer value, ProgramID, which is the primary key value upon which the Programs Table 303 is indexed and accessed. The Program_Segment records in the Programs Table 303 are relationally linked using the ProgramID key to other tables including:

- the Requested Table 301 discussed above,
- a Schedule Table 307 which contains the recommended sequence of program segments for the next playback session,
- a New_Catalog Table 308 which contains the identities of new available program selections to be added to the subscriber's catalog of available programming, and
- an Advertisements Table 311 containing entries which describe advertising program segments to be brought to the attention of the subscriber.

The relational database system employed by the preferred embodiment of the invention further includes a Subscribers Table 313 which contains information describing each subscriber, a Content_Providers Table 315 containing information about each person or firm which supplies royalty-bearing information for dissemination to subscribers, and an Advertiser Table 317 which contains information about each advertiser that provides advertising program segments to subscribers. Mailing addresses and other information for subscribers, content providers and advertisers is contained in a single Account Table 321 to simplify the data structures needed.

A Usage_Log Table seen at 333 is uploaded from the subscriber, typically at the same time the express program requests in the Requested Table 301 are transferred, and processed at 350 to update the Subscribers Table 313, the Content Providers Table 315, the Advertisements Table 311, the Programs Table 303, and the Requested Table 301 as described below.

Program Schedule Generation

In accordance with the invention, the host server receives and supplements the user's initial selection of a sequence of desired programs, first by adding the program selections specified in failed hypertext requests as indicated by the Usage_Log Table 333 during usage log processing at 350, and then by adding advertisements, announcements and additional program segments tailored to the subscriber's known preferences as indicated at 340 in FIG. 4, thereby producing the recommended Schedule Table 307 which is transferred to the subscriber, along with program segments, during the download transfer. Indeed, if the subscriber provides no selections at all, the host will prepare a Schedule Table 307 containing program segment selected entirely by the host on the subscriber's behalf. The programs, advertising and announcement segments which are added to the Request Table 301 to form the Schedule Table 307 are determined by a matching procedure 342 which may be better understood by first considering the content of the data structures which provide data utilized to make those selections.

The Programs Table 303, as noted above, contains Program_Segment records which describe the nature of each programming, advertising and announcement segment in the library which is potentially reproducible by the player 103. As illustrated by the type declaration above, each Program_Segment record specifies the account number (ProviderID) of the advertiser or content provider if any who may be charged or compensated for the actual playing of the program segment by subscribers. The record further contains a Classtype variable Class which indicates whether this segment is an advertisement, a program, a comment or an announcement.

The Class variable may also used to further subclass each program segment; for example, program segments which hold user-recorded comments may be designated as being "public" comments made generally available to all subscribers, "private" comments to be directed solely to the provider of the program_segment commented upon, and "host" comments to be directed to the host system.

The Program_Segment record's URL field specifies the location of the file containing the program segment in the file storage facility indicated at 304 in FIG. 4 (i.e., normally on the FTP server 125 seen in FIG. 1, but potentially including storage areas on the web server 141 or at any other accessible location on the Internet). In addition, the subscriber may wish to designate for future play a program segment already loaded into the player 103 by virtue of a prior download. The subscriber may elect to include an already loaded file because it was not reached in a prior playback session or because the subscriber wishes replay the selection. In that event, the ProgramID of such a selection is nonetheless included in the uploaded selection list (Requested Table 301), recognizing that at the time of actual download, the player 103 will only request the transfer of those program segments not already present in local storage. The uploaded Requested list 301 should accordingly be understood to be indicative of the requested content of a future planned playback session and not necessarily a listing of programs to be downloaded. The selection of files to download is preferably made by the player which issues FTP download requests from the server by specifying the URLs of the needed files.

The Created field contains a timestamp value specifying the data and time of day the program segment was created. In Created field allows user or host to select program segments by date and permits the listing of segments in chronological order in program catalog listings.

The Program_Segment record further contains a SubjectDesc field and a TopicDesc field, both of which take the form of ProgramID integers which identify other program segment records which contain detailed information on audio announcement and displayable text descriptions of subjects and topics. The descriptive text files for subjects and topics are displayable by the player 103 as part of descriptive catalog entries which enable the user to choose desired segments. Together, the subject and topic program segments provide a hierarchical catalog listing which provides the descriptive information about the associated content segments which enables the subscriber to make informed selections. The text specified by the SubjectDesc and TopicDesc fields may be searched using conventional keyword searching techniques to permit the subscriber to locate and identify particular programming of interest from the locally stored catalog or, in a dial up CGI interaction with the host, to list and select programs from the larger library available on the server.

Serialized Programs

As contemplated by the invention, programming may include serialized sequences of programs. A given program segment may represent an episode in a series which is selected as a group by the subscriber, or a subscriber may select an individual program in a serial sequence and the host may then further installments or related programs within the series to the catalog or session content thereafter sent to the subscriber. The Program_Segment record contains a GroupID field which specifies the series as a whole, and an Episode integer field specifies the position of the given program segment within the serialized sequence. When a serialized sequence is requested, the host may download the entire series in one download for playback at requested intervals, or less than all of the episodes when all are not yet available or when it is desirable to limit the total download content. When a subscriber selects and plays a given program segment, as indicated in the usage log, without having expressly selecting the entire series, the host may then add the next installment to the catalog or the next proposed session. If desired, a hyperlink (to be described) may be placed at the conclusion of each installment which specifies the next installment as the linked program segment. In this way, the listener may request that the next installment be played immediately (if it is available) or included in the next installment (if it is unavailable and the hyperlink fails).

The usage log may be employed to insure that the subscriber has an opportunity to hear episodes that may have been skipped. By monitoring the usage log, if an episode included in any given proposed session was not in fact played, the host may include it in the next proposed session as well. Note further that the serialization mechanism which has been described can be used to provide serialized advertisements to a subscriber, insuring that a subscriber does not hear a particular ad twice and further insuring that the advertising is presented to the subscriber in the intended sequence.

In addition, the serialization mechanism may be used to provide sequential presentation relationships between related programs. For example, if a subscriber indicates an interest by selecting and actually playing a program on an evolving topic; for example, a news story about the America's Cup yacht races, further new stories on that topic may be assigned the same Group ID number so that they are automatically routed into the subscriber's catalog or program session if space is available.

Fields supporting "Comments"

Serialized programs are related to, but should be distinguished from, the parent-child relationships that exist between program segments and the annotations and comments made on those program segments by users. As noted earlier with respect to the Accept command seen at 263–264 of FIG. 3, the player 103 of FIG. 1 permits the user to create an "annotation" or "comment" (typically in the form of a recorded audio message or a keyboarded text message) which is uploaded to the host 101 and stored as a program segment. The CommentOn field of the Program_Segment record contains the Program_ID of the program segment commented on, the Provider_ID field identifies the subscriber generating the comment, the Created field specifies the date and time when the comment was recorded, and the default values of the subject matter fields (discussed next) are copied from the subject matter fields of the program segment being commented on. These field entries provide a mechanism for supporting the comment handling features which are described in more detail below under the heading "Comment Handling."

Program Selection

The Program_Segment record further includes a Subjects field which is an array of 16 integers, each of which may be a non-zero code value indicating a predetermined subject matter categories, allowing each programming segment to be matched against like codes specified as being subjects of interest by the subscriber, as well as codes indicating subjects to which advertised goods and services may relate.

The Program_Segment record also contains an importance field which is also an array of 16 integers which (at least initially) holds an integer containing the reviewer/editor's assessment of the "importance" of the program segment relative to the subject matter code specified in the corresponding cell in the Subjects array. Thus, if Subjects [7]=12345 and Importance[7]=231, this program segment has been assigned a importance level of 231 with respect to the subject specified by code 12345. Another segment may also be relevant to the same subject, but with a different level of importance to that subject. These fields may be used by the host as a weighting factor used to route programs of greater probable interest to the subscriber. Note also The "importance" value associated with any given program may also be adaptively altered based on the actual use as reflected by the usage logs and by subscribers' catalog selections. By way of example, program segments which are started but frequently skipped while in progress may have their importance value decreased while program which are frequently selected from the catalog and listened to may have their importance values increased. In this way, the system adaptively learns, for each categoy or programs, which programs subscribers have found to be of interest and which ones were seldom used. Serialized programs (identified by a common Group ID) may be assigned importance values based on the actual usage of earlier episodes in the same series. Thus, when a series proves to be popular based on repeat selections of its episodes, all episodes (including those not yet issued) may be assigned a higher importance value.

The Youngest and Oldest fields (each storing a byte value 0–255) contains an indication of the age range to which a particular program segment should appeal. Similarly, the byte values Female and Male allow the entry of an estimate of the relative interest of a given program to the different sexes: thus, a program devoted to sports news could be assigned the values Female=60, Male=170 where the value 127 would indicate gender-neutral content. The MaritalStatus field is a single character ("S"=single, "M"=married, "W"=widowed, "D"=divorced).

The fields HouseLow and HouseHigh represents a range of household sizes range that may have a special interest in the program segment. Thus, programming directed to family interests may be directed to subscribers who are married with a household size equal to 3 or more.

The Duration field of the Program_Segment record specifies the duration of the program segment expressed in seconds. The Plays field is an accumulator field which is incremented by incoming Usage_Log records to reflect the total number of times a given program segment has been actually played by all subscribers. Similarly, the TotalTime value represents the total time a given program segment has been actually played by users. Together, these records can be used to determine the advertising fee due from the advertiser, or royalty amount payable to the content provider (the advertiser or content provider being specified the ProviderID field) for the use of this segment.

The Program_Segment record contains two signed integer values, PlaysRate and TimeRate, permitting an advertising charge or royalty payment (Amount) to be calculated as a value calculated by the executable formula:

Amount:=(Plays*PlaysRate)+(TotalTime*TimeRate) If PlaysRate=0, the amount of the royalty or advertising fee for actual use of the segment can calculated based solely on the actual time duration of the played segment (so that little credit or charge is assigned if the segment is begun but then skipped). Alternatively, if TimesRate=0, the charge can be based solely on the number of times playing the segment was commenced, which may be deemed appropriate when it may be considered the responsibility of the advertiser or the content provider to hold the user's attention once a segment begins. Note that, as usage records are posted to increment the Plays and TotalTime fields in the Program_Segment records, as described later, any program segment which was played for less that a predetermined minimum amount of time may be disregarded, enabling the subscriber to "surf" through selections while listening to minimal information per segment without incurring subscription charges or generating advertising fees or royalty payments.

Program segments are selected for inclusion in the output Schedule Table 307 and/or the NewCatalog Table 308 by comparing the content of the Programs Table 303, the Subscribers Table 313, and the Advertisements Table 311. The fields contained in the Subscribers and Advertisements Tables are set forth in the following Pascal record type declarations:

```
Account = record
    AccountNo: integer; { Unique key }
    Name, Title, CompanyName: pchar;
    Addr1, Addr2, City: pchar;
    State: string[2];
    Zip code, AreaCode, Phone, Fax, Email: pchar;
  end;
Subscriber = record
    AccountNo: integer;
    Birthdate: Date;
    Sex, MaritalStatus: Char;
    HouseholdSize: byte;
    Interests: array[0..15] of integer;
    TopChoices, ChoiceCounts: array[0..15] of integer;
    ChargeLevel: byte;
    DataRate: Integer;
    Capacity: Integer;
    WeekDays: array[0..6] of Compilation;
  end;
Advertisement = record
    ProgramID: integer;
    AccountNo: integer;
    DemographicMatch: function_id;
    DemographicWeight: byte;
    Earliest, Latest: datetime;
    Subscribers: integer;
    Repeats: byte;
      end;
```

The Accounts Table seen at 321 in FIG. 4 is indexed by a key value AccountNo which is unique to each of its Account records. The fields of those records contain name, mailing address, telephone, fax and email information for all subscribers, advertisers and content providers in a single shared file. A person or firm specified by a record in the Accounts Table could simultaneously be a subscriber, advertiser and a content provider, in which case the same AccountNo key value would appear in each of the three tables: Subscribers 313, Content_Providers 315 and Advertisers 317. Prospective or inactive subscribers, content providers and advertisers may also be described by entries in the Accounts Table which are not referred to in any other tables.

Additional information about each active subscriber is contained in the Subscriber record indexed by AccountNo (a key shared with the Accounts Table). The Subscriber record specifies personal information about the subscriber, including birth date (from which age may be determined), sex, marital status, and household size, all of which may be of use in better selecting program material of possible interest which should be brought to the attention of the subscriber.

Each Subscriber record further includes two arrays of integers which indicated the subscriber's subject matter preferences. The interests array contains 0 to 16 integers each indicating a subject matter category of interest to the subscriber, the integers having the same meaning and being take from the same category listing as the integers placed in the Program_Segment record's Subject array. These integers are placed in the Interests array in response to the subscriber's indication of subject matter preferences when the account is established as indicated at 203 in FIG. 2 or at any time thereafter when the subscriber elects to modify the stated preferences at step 217 in FIG. 2.

A second array of 16 integers called TopChoices is an ordered list of the same subject matter integers; however, in this array the subject matter integers are listed in order of actual playing frequency as indicated by the parallel array of ChoiceCounts integers. For example, the subject matter integer 321 in TopChoices[3] and the count 18 in ChoiceCounts[3] indicates that 18 selections had been played in the category 321 which was the fourth most-frequently played category. The ChoiceCounts array is modified whenever the usage log indicates that a selection in a particular category has been played by that subscriber. As a consequence, the TopChoices and ChoiceCounts arrays provide an indication of the subscriber's interests as indicated by his or her actual use of the player.

The ChargeLevel field in the Subscriber record indicates the subscriber's willingness to accept the insertion of commercial messages into the programming in order to defray subscription costs. A ChargeLevel value of zero indicates that the subscriber desires to pay the minimum charge and correspondingly is willing to accept sufficient advertising content to achieve that goal. At the other extreme, a ChargeLevel value of 255 indicates that the subscriber wishes to eliminate all commercial messages except those specifically requested.

The DataRate field indicates the rate at which information can be downloaded to the subscriber over the available communications link (typically dependent on the capacity of the modem used by the subscriber). The DataRate field is initially established from information supplied by the subscriber when the account is established (at step 203 in FIG. 2) but is thereafter altered to reflect actual averaged transmission rates experienced during download operations. Similarly, the Capacity field indicates the available mass storage file space available for program data in the player store (seen at 109 in FIG. 1). This value is initially supplied by the subscriber during account initialization, automatically reduced whenever the utility programs executing on the processor 105 detect less space available, and increased whenever the subscriber consents to the allocation of more available space when the utility programs detect that space is available and that additional space could be beneficially utilized given the download time available and the subscriber's desired session lengths.

Desired session lengths are contained in seven records each of type Compilation as defined in the following record definition:

```
Compilation = record
    Earliest, Latest: datetime;
    PlayMinutes, Longterm: Integer;
      end;
```

Each Compilation record describes the download requirements for a specific day of the week and contains fields specifying the earliest and latest times of day when download can be begun, with the latest download time being at least a predetermined time in advance of the session start. In this regard, it should be noted that playback and download can occur concurrently, with the Schedule Table being downloaded first, the NewCatalog Table being downloaded second, program segments specified in the Schedule Table which have not previously been downloaded being transferred third (in the order of the expected presentation as stated in the Sequence Table), with program segments selected by the subscriber for future sessions being downloaded last as download time permits. In accordance with the invention, it is desirable to download the equivalent of a full session's programming in addition to the currently scheduled session programs so that, in the event of a temporary communication link or host failure, programming will be nonetheless be available. In installations which utilize download information to a removable media cartridge or a transportable player which is then played back in an automobile or elsewhere, and hence disconnected from the data link to the host, it will of course be necessary to complete the download prior to the disconnection, meaning that the Latest field in the compilation record should be a time which is in advance of the earliest expected session start time by a duration equal to the maximum expected download time. Because the subscriber may wish to use different download timing on different days of the week, a separate compilation record exists for each day.

The compilation record further specifies the expected duration of the playback session for that day using the variable PlayMinutes. The variable Longterm indicates the maximum duration in which extended play may be required. For example, a commuter who sometimes experiences long traffic delays on Mondays and Fridays may specify that an extra hour of extended programming should be provided for those days. Such extended programming is preferably consists of non-time critical programming which can be stored for future use as needed by the player.

Note that the compilation records noted above are used by the server to optimize the content of the recommended program schedule and not to initiate actual downloads to the player. As contemplated by the invention, the player initiates the actual downloads by sending download requests to the server. Nonetheless, the server can transmit to the client player an indication of optimum times when downloading should be requested. In this way, the load imposed on the server can be spread over time to avoid delays.

Program segments which are of interest to the user and which should be included in either the Schedule Table 307 or the Catalog Table 308 may be automatically identified by the following mechanisms:

- the subject matter codes (Interests, TopChoices and ChoiceCounts) for a given subscriber for whom the Schedule Table 307 and Catalog Table 308 are being prepared may be compared with the subject matter contained in the Program_Segment record's Subject for each subject category description and each individual program description. Note that the Program_Segment record for a subject category description may identify related categories. In this way, an indication that a subscriber is interested in a particular category may be used to identify that category, any related category, and any program which specifies that category in its Program_Segment record. A weighting value may be calculated to indicate the extent to which the subscriber's stated interests match a given program or category of programs. Programs to which high weighting values are assigned are placed in the Schedule Table if the usage log data does not indicate the subscriber has already played that program, whereas the remaining programs having a weighting value greater than a predetermined threshold are placed in the Catalog Table 308. The duration of the programs specified in the Schedule file 307 is governed by the scheduled session lengths, communications throughput, and client storage capacity values contained in the DataRate, Capacity and WeekDays fields of the Subscriber record.
- The attributes of the subscriber (birthdate, sex, marital status, and household size) specified in the Subscriber record may be matched against the corresponding descriptions contained in the subject and program Program_Segment records (youngest, oldest, male, female, houselow, househigh) to identify programs and categories of programs likely to be of interest to a subscriber having those attributes. An advertiser-supplied function defining this relationship is specified by the DemographicMatch function_id field of the Advertiser record, as discussed below.
- The host server may advantageously use an optimization technique such as linear programming to complete the segment selection process. The optimizer will take into account the Subscriber's time constraints, cost constraints, and subject preferences. The time constraints used in the optimization are: the playing time available for the current day at the player, the download time available, the percentage of segments usually skipped by the Subscriber. The cost constraints are Subscriber ChargeLevel and the accumulated value of individual advertising segments. The subject preferences are based on the user's expressly stated interests and others interests inferred from the user's playing selections, as noted earlier. Each segment resident in the database at the time of download is evaluated against the constraints and the optimizer thus chooses a set of segments which is best for the subscriber at that time.
- The weighting value computed for a segment in the database may also be advantageously varied in accordance with the age of the segment; that is, segments will decline in value as they age with the rate of decline being depend on the Timeliness attribute stored in the Program_Segment record. If the subscriber misses a download for a given day, the timeliness factor will allow the host server to compensate for the lost listening opportunity by adding articles from prior days which are still of interest to the Subscriber.

Targeted Advertising

In order to identify and insert advertising program segments into the Schedule Table 307, the preferred embodiment of the invention utilizes additional information which describes each advertisement to be placed before subscribers. This information is placed in an Advertisement record having the structure defined earlier and held in the Advertisements Table 311. The ProgramID field of the Advertisement record identifies a Program_Segment record (described earlier) which describes the content of the advertisement itself. The remainder of the Advertisement record contains additional information used to control the manner in which the identified advertising program segment is selected for insertion into the programming supplied to subscribers.

The AccountNo field of the Advertisement record identifies the entity requesting the advertisement which is typically the same as, but not necessarily the same as, the entity specified in the ProviderID field of the Program_Segment record for advertising segment. The Subjects and Importance arrays in the program segment for the advertising (specified by the ProgramID field) may be matched the subject matter categories used by or created for subscribers to indicate their interest and may be used to produce a numerical value InterestMatch indicative of the extent to which a given advertisement is likely to be suited to the interests of a particular subscriber. The following algorithm, expressed as a function in Pascal, returns an integer value, which may be employed to derive the InterestMatch value indicating the degree to which any program segment matches the interests of a given subscriber:

```
function InterestMatch(SR: subscriber; PSR: program_segment):
integer;
var I: integer;
      InterestCount: integer;
      ChoiceCount: integer;
begin
   InterestCount:=0;
   ChoiceCount:=0;
   for I:=0 to 15 do
      if PSR.subjects[I] > 0 then
         for j:=0 to 15 do
            begin
            if SR.Interests[j] = PSR.Subjects[I] then
               inc(InterestCount, PSR.Importance[I]);
               if SR.Topchoices[j] = PSR.Subjects[I] then
               inc(Choicecounts, (20-j)*PSR.Importance[I]);
         end
      else break;
      return(InterestCount + (ChoiceCounts div 10);
end; { InterestMatch function }
```

The foregoing function identifies all of the Subjects codes specified by the program_segment record for a program segment (including a segment specified the ProgramID value of the Advertisement record for that advertisement) which also match a subject matter code in which the subscriber described by the Subscriber record SR has expressly stated an interest, or has shown an interest base on programs actually played. In each case where a match was found, the Interest_Match value is increased by an amount related to both the weight given to the category in advertising program's Importance array and the level of interest indicated for the subscriber. Note the InterestMatch function described above can be used to generate a numerical indication of the degree to which a given subscriber may have an interest in any program segment, whether that segment contains advertising, entertainment, news, or other content. In the case of advertising program segment however, the Subject and Importance values are assigned by the advertiser in order to define the interests held by target subscriber to whom the advertiser wished to direct the advertisement.

In addition to the InterestMatch value determined above, weight may be given to the subscriber's personal characteristics using a similar weighting function specified th the function_id DemographicMatch which, like interest match, returns a value based on an advertiser specifed relatiionship based on the subscriber's personal characteristics (age, sex, marital status, size of household, etc.) as previously noted. The value DemographicWeight may be used to specify the relative importance of demographic values derived by the the DemographicMatch function and the value returned by InterestMatch.

All advertisements scheduled for a given subscriber may then be prioritized based on the resulting calculated weight assigned to each advertisement by matching algorithms which compare the characteristics of the subscriber with the makeup of the target audience defined by the fields of the Advertisement record. These advertisements are then preferably inserted into the programming Sequence with the advertisement having the highest weight being scheduled to occur first in the sequence, thereby insuring that the best fitting advertisements are included in the programming and most likely to be played by the subscriber.

Controlling the Quantity of Advertising Delivered

The rate at which advertising is actually inserted by the player is controlled by the ChargeLevel value in the Subscriber record for each subscriber. The ChargeLevel value (a number from 0–255) indicates the rate at which a subscriber is willing to accept advertisements. An advertisement duration count variable (not shown) maintained by the player 103 accumulates the total duration of actually played advertising while a program duration count variable accumulates the total duration of actually played programming. An integer division of these to duration count values indicates the proportion of time being devoted to advertising. If this proportion falls below a threshold value determined by the value of ChargeLevel, additional advertising is inserted between program segments until the desired proportion is again reached. In this way, advertising skipped by a subscriber will be replaced later by different advertising to yield the proper proportion of programming to advertising, thereby achieving the subscription charge rate requested by the user.

The Schedule 307 downloaded to the player, and the associated programming, announcement and advertising segments sufficient to provide a complete program sequence with adequate advertising to meet the preference of the subscriber, creates total program content longer than the expected playing time indicated by the PlayMinutes variable of the days Compilation record. As a consequence, the player builds a collection of program and advertising segments which can be played in the future and need not be downloaded. Downloading of actual program segments therefore preferably occurs at the request of the player which scans the Schedule for program and advertising segments not already available and issues a request for the needed segments using the URLs contained in the players catalog of Program_Segment records. In addition, as noted earlier, the subscriber has the opportunity to review the local catalog for particular program segments of interest which can be placed in the next day's schedule (and downloaded then at the request of the player if not already resident). The catalog of available items is supplemented by the NewCatalog Table items downloaded from the server as library items are identified whose makeup matches that of the subscriber and should be included, either immediately in the days Schedule Table, or made available by inclusion in the downloaded NewCatalog Table alone.

Accounting Functions

The preferred embodiment of the invention processes the usage log data created during the playback session as described in connection with FIG. 3 to produce a variety of accounting and analysis reports and billing functions.

Each advertising, announcement and program segment played on the player creates a UsageRecord stored as an record in the Usage Log Table having the following content:

```
UsageRecord = record
      Subscriber: integer;
      ProgramID: integer;
      Start: datetime;
      Volume: Integer;
      PlayingSpeed: Integer;
   end;
```

The Subscriber field contains the AccountNo of the subscriber which used the program segment, and the program segment itself is identified by the ProgramID field. If the value of ProgramID is negative, the record indicates a failed hyperlink attempt and the ProgramID is posted to the Requested Table 301 so that the formerly missing program segment will become a candidate for downloading to the player. In the UsageRecord, the Start field contains the starting time of day (to the nearest second), the Volume field contains a value indicating the level at which the volume was played, and the PlayingSpeed field contains a value indicating the playing speed. A negative playing speed value may be used to indicate that the player was placed in the "play highlights" mode so that only highlight passages were being played.

As noted earlier, each UsageRecord is processed to modify the Subscriber record field TopChoices by first building an ordered list of subject matter categories and the corresponding counts of the number of times each category was played in the session described by the Usage Log Table. These counts are then used to increase the existing Choice Counts for the subject matter codes indicated in the TopChoices array, and the TopChoices and ChoiceCounts arrays are then jointly resorted into order by descending number of plays. To insure that subject matter categories recently used are allowed entry into the list, the lowest five old entries are discarded each time if necessary to make room for the five most frequently played categories in the current usage log which were not already on the list. The TopChoices array accordingly contains an adaptively learned set of subscriber subject matter preferences which is continuously modified automatically without requiring attention from the subscriber.

Subscriber billing is based on the accumulated amount of programming actually played by the subscriber with credit being given for advertising actually presented to the subscriber. To accomplish this, a detailed billing history can be constructed from the usage log which indicates the programs heard, the duration of each, and the cost (or credit) attributable to that program segment. The TimeRate value specified in the Program_Segment record for each item specified in the UsageRecord's ProgramID is multiplied times the segment duration (determined by subtracting the start time of the segment from the start time of the next segment specified in the next UsageRecord). The TimeRate is a signed integer, with negative values being indicative of credits (for advertising) and positive values being indicative of charges for programming. Note that each program segment and advertising segment can have a different rate, allowing the system to accommodate charging rates that reflect different programming costs.

Such costs frequently are affected by the royalty rates charged by content providers as well as the extent to which costs are defrayed by advertisers. In accordance with the invention, each UsageRecord may also be posted into the Content_Providers Table 315 which maintains royalty payment records for amounts due to content providers. As in the case of subscriber billing, the processing of UsageRecords allows the embodiment shown in FIG. 4 to provide detailed information to content providers, identifying the extent each provided program segment was actually performed. Content providers can also be provided with demographic statistics identifying the characteristics of the subscribers who chose to play the content provided, as well as an identification of the extent to which program segments were skipped while in progress, tending to identify programs which were had continuing appeal during the session and those that did not.

Similarly, advertisers can obtain detailed billing records indicating the precise extent to which advertising was actually presented, and paying only for advertising known to have been effectively delivered. In addition, demographic data can be provided to advertisers indicating the makeup of persons who played the advertising, as well as the demographic characteristics of those who did not, in order to better target future advertising.

Finally, the UsageRecords are processed to post use data into the Programs Table, modifying the Plays and TotalTime fields of the Program_Segment records to reflect the extent to which programming materials are actually presented. This information, as well as the demographic statistical information indicating which classes of customers are listening to which classes of programming, is of substantial value in collecting a library of offered programming which best fits the needs of the community of subscribers.

Program Format and Organization

The programs which reside in the program database 303 seen in FIG. 4 are preferably formatted in accordance with a standard structure to facilitate "skimming" the sequence of program segments defined by the selections file 351, and to make it possible to perform jumps to different predetermined locations in the program sequence.

As previously noted, the program database 303 may include, for a given program segment, both a recorded audio narration and a text transcript or, in the alternative, a text transcript alone which can be converted into a spoken narrative by speech synthesis. While these narratives must be listened to in a linear sequence, it is nonetheless possible to selectively access individual program segments by organizing the overall program compilation into a hierarchical structure in which:

As noted earlier, the program segments which are available in a master library are described in a catalog and associated with descriptors of various kinds, allowing the content of the compilation to be tailored to the preferences of the subscriber, both through express selections made by the subscriber and by selections (or suggestions) made automatically by matching the subscribers known preferences and interests against descriptors which characterize the programs segments, as previously described.

The resulting program compilation is then divided into components each having a beginning, or entry point, to which jumps can be made by the listener by a dynamic selection mechanism which is operative during the listening session.

A given program segment (i.e., an entity described in the program catalog and selected automatically or expressly by the user as being of interest as previously described) is advantageously combined with other related program segments to form a sequence of associated segments here called a "subject," forming a subsection of the overall compilation. A "subject" collection of program segments may (but need not) directly correspond to the named subject matter categories utilized to specify subscriber's preferences as noted earlier. A "subject" collection begins with or is preceded in the scheduled program sequence by a spoken announcement of the subject, giving the user the opportunity to skip immediately to the next subject, thereby skipping all of the program segments comprising that subject. As a consequence, by the simple expedient of skipping from subject announcement to subject announcement, a user can locate a particular subject of interest. For example, if a given program compilation as defined by the Selections file (having the format illustrated at 351 in FIG. 5) contains one hour of programming divided into 8 different subjects collections, the user can quickly locate a subject of interest by skipping from subject announcement to subject announcement until a subject of interest is announced, at which time the player is allowed to proceed to the next level in the hierarchy, a "topic" announcement for the first program segment in that subject collection.

Each program segment begins with a "topic" announcement which consists of a brief, summary description of the content of the program segment to follow. Again, at this level, if the user upon hearing the topic announcement elects to skip that program segment, the player automatically advances to the entry point preceding the next topic announcement. In this way, within a given subject, the user can skip from topic to topic to select only the program segments of interest.

Following the topic announcement, if the program segment consists of narrative text, such as a news program, the narrative is presented in a sequence of paragraphs, with the first paragraph providing an overview summary of the content of the program segment (topic) and the succeeding paragraphs providing increasing levels of detail. The narrative is thus presented in a fashion not unlike that followed in news stories written by journalists for print publication, but with more dependable rigor, recognizing that the listener presented with a one-dimensional audio presentation must necessarily depend on the consistent adherence to the subject, topic, summary paragraph, and increasing detail sequence to substitute for the random access provided by two-dimensional presentation of headlined newsprint articles.

Finally, within paragraphs, the sentences should be carefully organized with leading topic sentences, again giving the listener a preview of what is coming next in the sequence to enable that material to be skipped if it is not of interest.

By way of example, a program compilation for a given subscriber might illustratively consist of seven subjects: world news, national news, local news, computer trade news, email and voice mail messages, country music, classical music, and the listener may skip from subject announcement to subject announcement to readily locate the beginning of any one of the six subjects. The four "news" subjects each consist of a collection of structured program segments, each of which begins with a subject announcement, again allowing the user to skip from subject to subject, listening to only those which are found to be of interest.

Similarly, the music selections ("topics") within each of the two music subjects, "country music" and "classical music," are preceded with a brief announcement identifying the musical selection which follows, allowing the user to quickly skip from announcement to announcement until a desired selection is found. Because many listeners prefer music without announcements, the subscriber may request that the announcements be suppressed during continuous play and/or that the beginning of each musical segment be played instead of identifying announcements when the musical collection is being "skimmed" to locate the next selection to be played. To simplify the player controls, the subscriber is preferably selects the extent to which narrative music identification announcements are to be played at step 211 seen in FIG. 2, at the same time the user is given the opportunity to edit the downloaded program sequence.

Play Highlights Mode

To further facilitate rapid skimming, the player may be adapted to support playback in what is here termed the "play highlights" mode. Just as a student often uses a marker to highlight important names and phrases in printed text, key points in the audio narrative may be tagged as highlights such that, when the user places the player in a "play highlights" mode, the player automatically skips from highlighted passage to highlighted passage, greatly increasing the speed of presentation, but allowing the user to revert to normally play mode whenever a highlighted passage attracts the users interest for more detail.

Highlighted passages may be advantageously identified by means of a sequence of relative byte locations (integer offsets from the beginning of the program segment) which form part of the selections file 351 and which specify the start and end of each highlighted passage. The player, when placed in the "play highlights" mode, then plays only those passages identified as highlighted portions of the program segment file.

Hyperlink Jumps

In addition, the structured program files may advantageously contain, where appropriate, "hyperlink" passages, which may take the form of announced cross references to other materials, or sentences or phrases which describe related information contained elsewhere in the download compilation but which do not follow immediately in the sequence. In order to alert the listener to the fact that a sentence or passage is a hyperlink to other information which is out of the normal playback sequence, an audible cue may advantageously proceed, accompany, or immediately follow the passage in the normal playback which identifies the character of the hyperlinked material. Using the terminology typically employed to described hypertext, the normal programming sequence includes "anchor" passages which are identified by an audible cue signal of some type and are further associated with a reference to hyperlinked material to which the playback may jump upon the listener's request. Hyperlinked material, like all other programming, is advantageously preceded with a topic description and, if the hyperlinked material is a narrative, it should begin with a summary paragraph, followed by increasing detail.

A hyperlink may be directed to a program segment which is not present in the current selections list. In that case, the Link variable contains a negative number to distinguish it from references to a particular Selection_Record, and is interpreted as the negative of a ProgramID number. If the referenced ProgramID is available in the player's mass storage system, it may be fetched an played and, upon its conclusion, an automatic return is made to the original sequence. If the referenced ProgramID does not refer to a locally stored record, the listener is informed that it is currently unavailable, but will be included in the next download for the next session.

In addition to having means for accepting a user command to execute a jump to the hypertext material, the player also advantageously includes a mechanism (special key or voice command response) which, when activated, causes a "return" to be made to the playing sequence at the point of the original anchor from which the hyperlink was performed. In this way, a listener may listen to as much or as little of the linked information as desired, retaining the ability to return to the original. Just as computer subroutines may be nested by saving the return addresses of a calling instruction in a stack mechanism, a hyperlink may be executed from within a hyperlinked narrative, and so on, with the listener retaining the ability to execute a like sequence of returns to resume the playing sequence at the point of the first hyperlink call.

To control subject and topic skipping, as well as hyperlink jumps, the selections file seen generally at 301 in FIG. 4 preferably takes the form of a sequence of records, each having the structure defined by the following Pascal record definition:

```
type Selection_Record = record
    LocType: Char;
    Location: Integer;
  end;
```

where LocType is a single byte character having the values and meanings shown in the following table:

| LocType | Meaning |
|---|---|
| "S", "s" | Subject Announcement |
| "T", "t" | Topic Announcement |
| "P", "p" | Programming content segment |
| "Q", "q" | Advertising segment |
| "G", "g" | Glue (announcement) segment |
| "H" | Highlight start offset |
| "E" | Highlight end offset |
| "A" | Anchor start offset |
| "M" | Bookmarked anchor start |
| "B" | Anchor end offset |
| "L" | Linked segment |
| "R" | Rewind to identified location |
| "I" | Image identification |
| "J" | Image display start offset |
| "K" | Image display end offset |
| "C" | Accept comment |
| "V" | Accept value designation |
| "X" | Accept list termination |
| "Y" | Accept "Yes" / "No" |

As seen in the table, highlight passages are specified by two Selection_Records, an "H" marking the beginning and an "E" record marking the end of the highlight passage. The Location field in each record contains the byte offset from the beginning of the current program segment whose identity is specified by the last preceding "P" Selection_Record which contains the ProgramID of the program segment in which the highlight passage occurs. "Q" advertising segments and "G" announcements segments behave like regular programming content segments, but are uniquely identified to enable the player to skip over, or skip to, advertising and glue segments when appropriate. In the "play highlights" mode, the player scans the selections file and plays the program segments for each subject and topic announcements but plays only those portions of an identified program segment which are specified as highlight passages or as anchor passages for hyperlinks.

It is desirable to further provide a mechanism for subdividing narrative programming segments into subparts (e.g. paragraphs). Lowercase LocType values "s", "t", "p", "q" and "g" are used to subdivide subjects, topics, programming, advertising and glue segments respectively. The lowercase Loctype records provide the markers needed to implement subdivision skipping, as previously discussed, to enable forward and backward navigation within longer program segments, and further provides passage identifiers which may be used to better synchronize the audio and visual transcript presentation of longer passages.

An "I" Selection_Record contains an integer identification of an image file which is downloaded and stored using a filename found in an image filename table indexed by the image identification number. This indirect access to the image files eliminates the necessity of storing the filenames themselves in the selections file 351. The "I" image file identification records immediately precede a "J" record which specifies the offset location from the start of the compressed audio file where the image display begins. In normal "slide show" presentations, the current image display continues until the position indicated by a subsequent "I"–"J" record at which point the display shifts to the second image. The "K" record type is provided to indicate the position at which the current image display is turned off for those instances when it is desired to suppress the image display entirely.

Each anchor passage for a hyperlink is specified by three selection records: an "A" record indicating the start of the anchor passage, an "B" record indicating the end of the anchor passage, and a "L" record containing the offset location within the selection file to which a jump is made if the user requests a jump to the hyperlinked material.

As discussed in more detail later in connection with FIG. 7 of the drawings, the position and identification of highlighted passages, hypertext links and synchronized images may be conveniently expressed using conventional hypertext markup language to tag the text of the narrative to being presented in the interactive multimedia format contemplated by this aspect of the invention.

The start of bookmarked passages are identified with a special anchor designation, "M," followed by a "B" record to identify the end of the bookmarked passage. If a voice annotation is added, the player places it in its own program segment which is identified with a negative ProgramID in the following "L" record. The presence of the annotation may then be made known to the listener during subsequent playback of the marked passage by means of a distinctive audible cue, and the annotation may then be listened to in the same fashion as any other out of sequence linked material. Note that bookmarked passages and annotations are noted both in the usage log file, as discussed earlier in connection with FIG. 3 at 280 and 281, but also their presence is also recorded in the Selections file 351 by inserting "M", "B", and (if annotations exist) "L" records, making it possible to immediately replay annotations or return to replay bookmarked passages.

Annotations differ from "comments." Like an annotation, a comment is also stored in its own program segment, but a comment operates as a public or private message generated by the user and communicated publicly or privately to (1) a designated special interest group, (2) the originator of a program segment, which may be the author of earlier comment, (3) the system host, or (4) the person producing the comment to form a note for future reference. While both comments and annotations may be created at the request of the user at any point during a playing program segment using the "Accept" command (see 263–264 in FIG. 3), the user may be prompted by a pre-recorded request for a comment, or other user input, with the prompting request being placed at any point in a playing program segment, typically after an audio prompt which explains the nature of the information being requested.

Requests for information from the user preferably take one of three forms which are implemented by the records in the schedule file identified by the LocType codes "C", "V", "X" and "Y".

A "C" record causes the player to temporarily pause the playback and record a voice response from the user which may be arbitrarily long and which is uploaded to the server 101 to form a new program segment in the manner to be described under the heading "Comment Handling.

A "Y" record pauses the playback and awaits a "Yes" or "No" response from the user which is then recorded in the usage log. The yes/no response request allows a program provider to obtain response data from subscribers.

When simple "yes"/"no" answers are inadequate, a series of "V" records may be used to identify a set of prompt values from which the user may select, with the end of the list being indicated by a "X" record. The narrative of a program segment might, for example, proceed as follows: "We would like to know which of the following four ice cream flavors is your favorite. Say the word "YES" promptly when your favorite is mentioned. V chocolate V vanilla V pistachio V peach E". In the example, the V characters indicate the position of the start of each prompted choice and the E character indicates the end. If no affirmative voice response has been accepted by the time in the playback the position indicated by the E selection record, the player returns to the positions indicated by first of the series of V records to repeat the choices. When a valid response is received, a response value is written into the usage log indicating the ordinal position of the selected response. Given the prompts above, for example, if the user says "YES" after the "chocolate" prompt, the response value 1 is written to the usage log, if the user selects 'vanilla' a 2 is written, and so on.

The Selections File

FIG. 5 shows an illustrative sequence of Selection_Records making up a selection file indicated generally at 351 which illustrates the manner in which the user may navigate the playback session between playback positions designated by the selection file. At any given moment, the next item of programming to be played is specified by an integer register CurrentPlay seen at 353 which holds the record number of the particular Selection_Record in the selections file 351 to be played next. As shown, CurrentPlay points to a subject Selection_Record identified by the LocType "S" 355 and a Location field 357 which contains the ProgramID of an announcement program segment which describes the subject. If the user issues a skip command during or shortly after the time when subject announcement is played, the player executes a skip to the next subject, which is accomplished by scanning the selection file 351 until the next subject Selection_Record seen at 360 is located, and then performing a jump by inserting the location of Selection_Record 360 into the CurrentPlay register 353, causing the intervening material to be skipped as indicated by the dashed line 362.

If, instead, no subject skip is requested, the CurrentPlay register is incremented by one when the subject announcement concludes, causing the "T" Selection_Record 364 to be used to fetch and play the topic announcement specified by the ProgramID in the Location field of record 364. If a skip is requested during or shortly after the time when topic announcement specified by record 364 is played, the player scans the selection file 355 until the next "S" or "T" Selection_Record is found at 366, causing the intervening program material to be skipped and the topic announcement specified by record 366 to be played next. If, as illustrated by the Selection_Record 366, there are no more topics within a particular subject when a topic skip is requested, the player skips the remainder of the last program subject within the current subject collection and plays the next "S" subject announcement. Thus, topic skips take the user quickly to a subject announcement, from which subject skips may be executed until a desired subject is reached. In this way, a desired program segment, no matter where it is located with respect to the current selection, can be readily found.

If the user issues a skip command during the body of a program selection; that is, when neither a subject or a topic announcement is being played, the player advances to the next "S" subject or "T" topic record, skipping the remainder of the program selection. Thus, the user can quickly resume skimming on the subject and topic level at any time.

The user may also issue a "Back" command at any time. Back commands work like Skip commands at the subdivision, subject and topic level. If a Back command is issued when a subject is being played, the player scans backward to the previous subject announcement, which is then played. If the user issues a back command when a topic announcement is being played, the player scans backward to find the previous subject or topic announcement, which is then played. If the player issues a Back command during the playing of a programming segment, the player returns to the beginning of the prior subdivision (if any) or the prior topic announcement for the current program segment, thus enabling the user to easily "replay" a current segment from the beginning if desired. As in the case of forward skip commands (SKIP TOPIC and a SKIP SUBJECT), BACK TOPIC and BACK SUBJECT commands can be made available to the user such that backward navigation from subdivision to subdivision occurs using BACK TOPIC whereas the issuance of a BACK SUBJECT command always returns the playback point to the beginning of the prior subject matter description.

The manner in which a "Back" command is handled as described above is subject on additional variation: The position at which each skip forward command is issued may be advantageously saved so that, upon the issuance of a subsequent Back command, the user may return to the position at which the skip forward position was issued. This allows the user, for example, to skip forward to listen to the nest program announcement, and then use the Back command to return to the point from which the skip forward command was issued. These position indications may be saved as markers in a bi-directional list, allowing the user to skip forward or backward to any position from which a prior jump was made.

When the player is first activated, CurrentPlay is set to 1 to begin play with the first topic announcement specified by the ProgramID 357. The end of the selections file 351 is marked with an "R" Selection_Record 380 which contains the location value 1. When the player encounters this record, it resets the CurrentPlay register to 1, and the playing sequence begins again. This arrangement creates, in effect, an endless loop, allowing the user to skip forward in circular fashion through the entire program selection to locate desired programing, regardless of where the CurrentPlay register is set. When the player is given a further back command after the beginning of the file is reached, the backward scanning process finds the record 382, another "R" rewind record which contains the location of the last "S" subject Selection_Record. In this way, the selection file 351 behaves as a bi-directional endless loop.

Hyperlinks are implemented by means of anchor passage identifiers, the "A" and "B" Selection records which respectively identify the anchor passage, and a "L" link identifier which holds the location of a subject, topic or highlight Selection_Record. The "A" and "B" selection records enable the player to add an audio cue (such as a tone, low-level chime, or the like) to the beginning, end, or during any passage in any program selection. Whenever the user issues a "Go" command (seen at 265 in FIG. 3), the player will execute a hyperlink jump to the location indicated by the last "L" record in the selection file. When the jump is made, the location in the "L" record is inserted into the CurrentPlay register 353 after the previous contents of the CurrentPlay register are saved in (pushed into) a zero-based stack 390 at the stack cell location specified by the contents of a StackPtr register 392, which is then incremented. Whenever the listener issues a "Return" command, the previously pushed selection file record location is popped from the stack 390 and returned to the CurrentPlay register 353, and the StackPtr register 392 is decremented. A "Return" command issued when StackPtr=zero (indicating an empty stack) produces no effect.

The hyperlink capability described above may be used to implement a program menu of the type described earlier in connection with FIG. 3. A menu program segment may be included in the program compilation which includes a series of spoken descriptions of subjects or topics, each description being the anchor portion of a hyperlink to the corresponding subject or topic.

Although hyperlinks to subjects and topics are typical, it should be noted that the arrangement shown in FIG. 5 can be used to link any passage to the beginning or end of any highlighted passage or to the beginning or end of any anchor passage simply by placing the selection file location of that target in the "L" link Selection_Record forming that link.

In its preferred form, the individual program segments are stored in a random access mass storage system permitting program segments to be physically stored in an order unrelated to the actual dynamic sequence in which those segments are played. Forward and backward skimming, highlight playing, and hypertext jumps can accordingly be implemented without any noticeable delay being apparent to the user, unlike the delays which are experienced in forward and rewind operations on a physical tape player, or even the briefer delays experienced upon selecting a different track of a compact disk music album.

As contemplated by the invention, the integration of structured audio announcements and content, as will as cross-referencing and indexing information in the audio program compilation, allows the player to be much more interactive than a simple tape recorder. The user has the ability to browse and skip through the audio program in a very active way, without any requirement to look at a visible display of the program content. The ability to navigate the program using only audio prompts and/or small number of buttons for a user interface make the playback system which utilizes these features of the invention particularly attractive for use by automobile drivers, who can select their program content much more effectively and with less drive distraction than currently possible with a conventional automobile radio, tape or CD player.

Program Production

Figure 6:
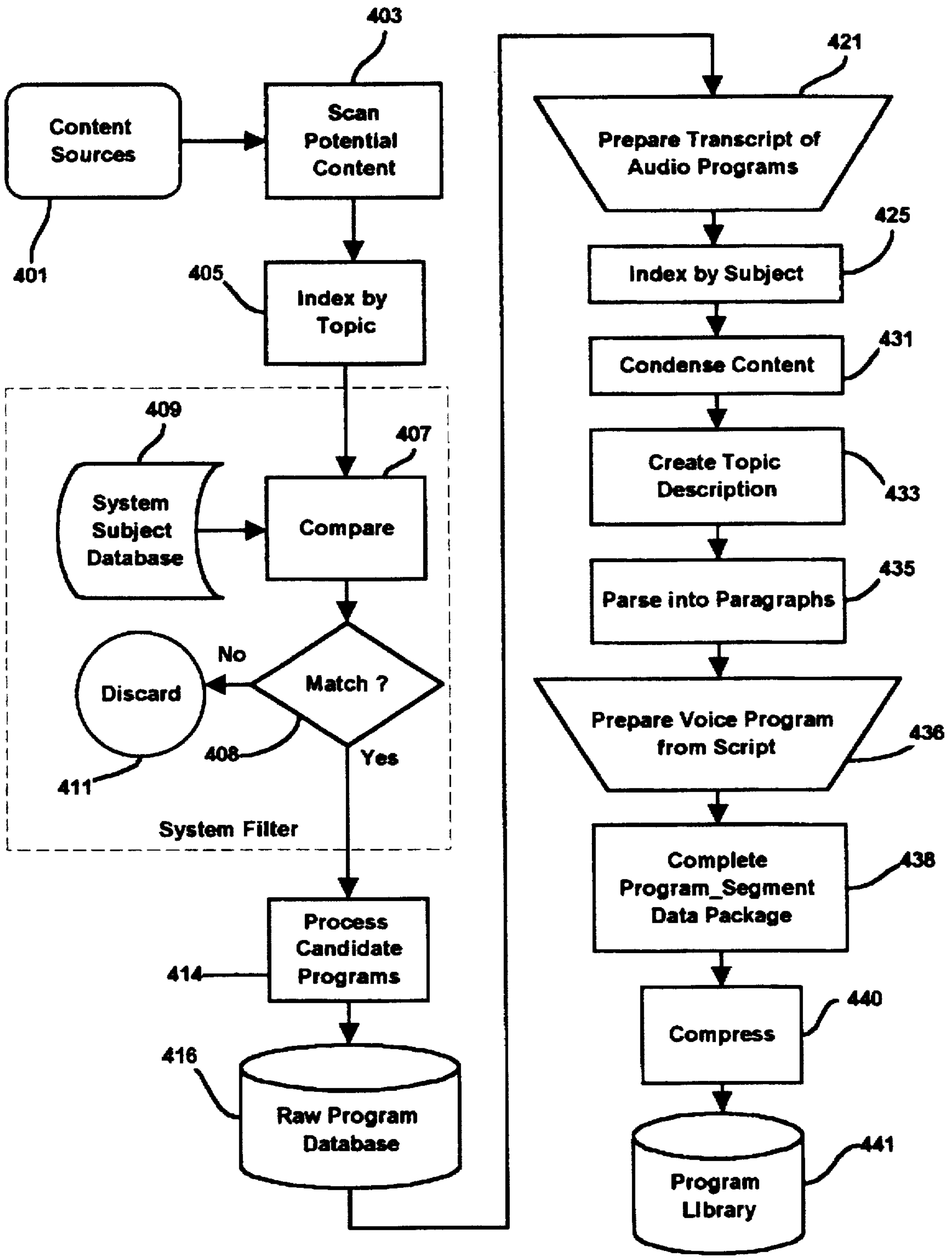
FIG. 6 is a flow chart which describes a preferred procedure for preparing the program content which is distributed to subscribers in accordance with the invention.

FIG. 6 shows the method followed to produce program content which is structured in accordance with the invention to facilitate interactive program selection. The first step in program production is to build a structured database of 'articles' which are candidates for inclusion in individual subscriber compilations.

The authoring system seen in FIG. 6 scans a wide range of data sources 401 for potential content as indicated at 403. Examples of data sources might be news service wire feeds or newsgroups on the Internet. The authoring system subdivides the accessed program data into program segments (topics) and indexes each segment by subject area at 405. In the case of text data, this indexing may be done automatically by parsing the text into words and building a conventional inverted file word index to the program segments. In the case of audio programming, a text transcript may be prepared using conventional speech recognition mechanisms to for a transcript, and the transcript may then be indexed by the terms used. Alternatively, human indexers may produce descriptive words and phrases to characterize the content of a program segment, and these descriptors may be used to index those segments.

After the indexing has been performed at 405, the authoring system then compares the each program segment's index data at 407 with system wide selection criteria in a system database 409 to provide a "System Filter." The system filtering function identifies those programs which of potential relevance to one or more of the established subject matter categories offered to subscribers. Accordingly, the system filter database 409 may take the form of a set of words (descriptors) of known relevance associated with each of the subject matter categories in the catalog. The comparison function at 407 scans the words in each candidate program segments to form a weighting value indicating the frequency (density) of the occurrence of descriptors for each category. Program segments whose content produces a high weighting value with respect to any category are automatically associated with that category and retained for further processing as indicated at 408, while program segments producing no weighting values greater than a predetermined minimum may be completely discarded at this stage, as indicated at 411, since their content does not indicate a sufficient likelihood of being of interest to a sufficient number of subscribers. Marginal program segments may be returned to the source library 401 for possible later use in the event that user preferences change.

Each article which passes the system filter at 408 is processed as shown at 414 in FIG. 6. As noted earlier, and as indicated at 421, the authoring system next prepares either a transcript for those segments which consist, in their original form, of voice narration. This step may be automated using speech recognition or manually by keyboarding to create the needed transcripts.

As indicated at 425, when the original material consisted of information in text form, a human reviewer verifies that the program content is in fact relevant to the subject matter categories identified by the automated system filter processing as noted earlier, and adds additional subject matter categories that may have been overlooked by the automated process. As a result of this automated and human-verified classification process, each program segment is associated with one or more subject matter categories which are encoded into a standard form in the Subjects array of the Program_Segment record described earlier in connection with FIG. 4. These subject codes are further assigned an importance value in the Importance array (which is parallel to the Subjects array) by the human author. Note that the order in which subjects codes are placed in the Subjects array may be used to indicate the relative relevance of the subjects to the program segment; that is, the most relevant subject is identified in Subjects[0], the next most relevant subject is identified in Subjects[1], and so on. Each program is typically placed in the output sequence in accordance with the code at Subject[0], the subject to which the program segment is most relevant.

In addition, the human review may compose a narrative cross referencing description of some or all of the program segments which were secondarily relevant to a given category; that is, program segments which were most relevant to another category but also relevant to the given category. This cross-referencing description may advantageously utilize the hyperlink capability discussed earlier such that, when the user is listening to the description of any related program segment, that related segment may be listened to simply by issuing a Go command to jump to the linked article, and later issuing a Return command to resume the playback at the original point.

The body of the program segment is then organized by the human reviewer at steps 431, 433, and 435 seen in FIG. 6 to create an output program segment having the desired structure consisting of:

- a topic statement which is packaged in a separate program segment,
- a leading summary paragraph,
- further content organized into paragraphs of increasing levels of detail, in which all unnecessary detail is excluded (that is, longer topics are digested into shorter, overview topics, with the full version being made available in an alternative, unabridged form which is also made available to the listener),
- adding highlight identification to key terms and phrases, and
- adding cross-referencing hyperlinks, with added explanatory anchor text if necessary.

When the original program segment is a news article or the like which was made available in text form, the foregoing operations may be most conveniently performed on the text, with the conversion to audio being performed by a human announcer or by speech synthesis after the edited, formatted and tagged text is produced. Thus, as shown at 436, the human reviewer may compose a new article which has condensed content at 431, add a topic (title) and summary paragraph previously created at 433, and then, at 435, add highlighting and hyperlink tags (which take the form of imbedded flags of the type used in Hypertext Markup Language "HTML" as described later in connection with FIG. 7). In order to assist the listener in deciding whether to listen to, or skip, a given subject, it is desirable that the topic and subject announcements include a statement of the playing time, particularly for longer program segments. In addition, the playing time is recorded in the Program_ Segment record for that segment in the field named "Duration" as noted earlier. A human announcer then reads the structured text, or it is alternatively converted into an audio program segment by speech synthesis, as indicated at 435.

If desired, the user may request the player to periodically issue a time of day announcement. The user may set a playback preference value indicating a desired time duration between time of day announcements. Each time such an announcement is issued, the last announcement time is recorded. Each time a logical break occurs between program segments, the last announcement time is subtracted from the current time and, if the result exceeds the desired announcement spacing, a new time of day announcement is issued.

In addition, at the user's option, the player may also periodically announce the duration of the unplayed portion of the session, enabling the listener to skip certain programs in order to play others when the actual listening time available is less than the time available to play the entire remaining program.

The player may be programmed to issue timed messages to the listener. For example, a program session may interrupted to remind the listener to perform some function at a particular time, such as listening to a scheduled radio broadcast. Alternatively, the player may be programmed to play identified segments at a particular time of day, or at a particular time relative to beginning of the session (for example, fifteen minutes after the session begins regardless of what has been played before or where the player is in the sequence). These programmed interruptions are preferably performed as automatic hyperlink, enabling the user to return to the regularly scheduled but interrupted programming simply be issuing a "return" command.

It should be noted that program segments may omit the "original" audio file entirely. Instead, the audio may be generated on the user's player using speech synthesis, with tag to speech conversion of the tagged highlighted materials including an audible cue. The text-to-speech technology might be especially useful for specialized subject areas, such as weather reports, sports scores, or stock market quotes, or other primarily informational articles where the content is significantly more important than the form of speech.

The availability of a collateral text file makes it possible to perform scanning operations to "find" particular words and phrases in the presentation, and perform a jump to that position in the file. Thus, the user may request the player to locate and play the next program selection in the sequence to contain the word "patent" and the player, in response to that request, performs a serial search through the transcript text associated with each program segment until the requested word is found, an a jump then executed to resume play at that location.

Using conventional text indexing techniques, the transcript files of the programs specified on the current program schedule, as well as the transcript files of other locally stored programming, may accessed by means of an inverted file in which each significant word in the playable library is associated with the an indexing record for each occurrence of that word, the record containing program segment identifier for the program segment including the word and the offset(s) within that segment where the word occurs. The availability of that inverted file allows the player to immediately inform the user of the number of time the term occurs to avoid fruitless searches as well as searches which find too much, without actually scanning the transcripts. The availability of the program identifier permits the player to play for the user an announcement of categories and topics along with a recitation of the number of word occurrences within that topic; for example, "The term 'cellular' occurs 7 times in [program segment announcement], 3 times in . . . "

Alternatively, when a program segment contains a condensation of an original, longer text article, the full transcript may be additionally made available by downloading it to the player where it can be listened to, by placing a hyperlink to the full version in condensed version, or printed for further review by the listener. If desired, this capability may alternatively be realized by placing the full version in a separate program segment, thus allowing the subscriber to select either the condensed or full version from the catalog, or to activate a hyperlink call to the full version if additional detail is desired after listening to the full version.

To encourage consistency, the reviewer/editor may adhere to the format set forth in article templates which describe the form different classes of programs should adhere to. For example, a template might say that a given audio article consist of a time announcement, an summary introduction including the article headline, and the body of the article. Templates may be expressed in a formal grammar which describe the desired program content in a consistent way. In addition, the templates may take the form of pre-written HTML forms where the program topic description is placed in the title and the program segment comment placed in the body portion of the HTML document, which may include tags to identify highlighted passages and hyperlinks as explained below in connection with FIG. 7.

The invention further supports the construction of serialized groups of program segments in which the sequential episode segments may be downloaded at one time or separately when necessary to conserve space or to handle sequential presentations which evolve in real time. Using hyperlinks, the listener may be given the option to continue listening at the next episode of the serial sequence, or to instead allow the player to continue with the next regularly scheduled program segment identified in the selections file, with the next episode being deferred until a later session.

In a similar fashion, complex subjects, such as "books on tape" and instructional materials formed by a sequence of lessons may be readily handled by the invention. The subject/topic hierarchy allows such materials to be presented in the catalog in outline form so that the subscriber can choose all or part of the presentation. The organization of such longer presentations into the structured form contemplated by the invention makes it easy for the listener to locate and replay segments of interest, and the highlight play mode facilitates the rapid review of longer presentations by focusing only the central points presented while allowing more detail to be readily accessed if desired.

When a given program segment contains recorded original audio, such the newly recorded narration of a human reader or an audio recording of a broadcast radio program, the file of selection records to be associated with that audio recording file is created by a human editor who utilizes suitable audio monitoring and editing equipment to listen to the playback of the audio playback file and identify the byte location within that audio file where highlight and anchor passages as well as response prompts which seek user input begin and end. In addition, for hyperlink selection records, the human editor supplies the identification of the cross-referenced material by specifying the symbolic name of another selection record associated with the same or a different program segment to which control is to be passed if the hyperlink is executed by the user. A crucial step in the production of each segment is the association of byte locations in the audio stream with the records in the selection file. This association may be done by a human technician or by automatic methods.

A technician would use a computer with suitable audio playback capabilities and software to play the audio stream and to simultaneously display the transcript if it is available. The software which plays the audio generates a new record in the segment file which contains the current byte location within an audio file whenever the human editor pressed a key. The significance of a byte location may be indicated by pressing a selected one of a plurality of keys. For example, the technician could generate Subject and Topic records with the correct byte offset simply by pressing the "S" or "T" keys at the right moment while listening to the audio program. The software could automatically generate the synchronizing segment record and prompt the technician to associate byte location thus identified with a corresponding location in the displayed transcript using a mouse or other positional identification means. When no transcript is available, the operator may be prompted to enter a topic or subject description via the keyboard.

The process of associating of audio location with segment records process could be automated by adding additional software to the technicians editing computer. For example, as indicated at 437, speech recognition technology may be employed to automatically identify when the live speaker changed in an audio stream. The monitoring program thus automatically generates a new record and prompt the technician to associate the record with data in the transcript. Besides speaker changes, the software may advantageously detect laughter, musical interludes, or laughter and use these to automatically generate segment records.

The completed program segment is assembled at 438, compressed at 440, and placed in the program library as indicated at 442 where it is available for downloading to subscribers. The program segment (topic) thus preferably consists of (a) a compressed audio program segment file, (b) a text transcript file of characters, which is preferably in HTML format or in a word processing format such as the Rich Text Format "RTF" readable by most word processing software, (c) possibly one or more image files for visual presentation with the audio content, (d) a file of Selection_Records for the program segment which identify the subject program segment announcement, the topic program segment announcement, and the program content program segment ("S", "T", "P", "Q," and "G" Selection_Records), as well as the highlighting and hypertext passages and collateral synchronized image files tagged within the body of the programs segment, and finally (e) a Program_Segment record for the segment which identifies all of its component parts and which is placed in the relational Programs Table 303 seen in FIG. 4. As explained below, the use of HTML to express narrative text facilitates the compilation of these constituent parts of a program segment.

It should be noted that the file of Selection_Records which forms part of the program segment data assembled at 438 may contain cross-referencing links and these links in turn contain location references to cross-referenced program segments or particular passages within other program segments. While a referenced program segment can be identified by the its Program_ID integer, the byte location of a particular passage within that referenced segment is not established until the editing noted above is completed. Consequently, symbolic names are preferably used to initially identify all highlight or anchor text passages, making it possible to use these symbolic names as relocatable addresses, just as symbolic names are used to identify addresses in computer source language which is first compiled and then linked to translate symbolic names into real addresses at run time. In this way, symbolic names used to identify cross-referenced passages may be translated into numerical selection file offset values loaded into the Location field in "L" Selection_Records. As discussed previously, these offset values are either positive values specifying the location within the Selections file of the Selection_Records which identifies the link target, or negative Program_ID values which identify program segments not specified by the current Selections file as being part of the current program session content.

Comment Handling

As previously discussed in connection with FIGS. 3 and 5, the apparatus contemplated by the invention advantageously includes means for accepting comments, yes/no responses, and value selections from a user during a playback session. As discussed in more detail below under the heading "Defining Audio Programming with HTML," these prompted user input responses are analogous to and can be composed using the <INPUT> tag form elements defined for use in standard hypertext markup language, where the "C" records in the selection file are analogous to <INPUT TYPE=“text”> HTML tags, the “Y” selection file records are analogous to <INPUT TYPE=“checkbox”> tags, the “V” records are analogous to <INPUT TYPE=“radio”> radio button tags. Together these prompt mechanism provide a robust mechanism for prompting the user for and collecting responses of various kinds.

This mechanism for obtaining prompted responses may be advantageously employed to request information from subscribers. For example, prompted requests may be used to obtain program ratings from at least those subscribers who are willing to participate in the program rating process. Using “V” and “E” records, for example, a user may be asked to grade programs by various criteria and the resulting data may then be used alone or in conjunction with other values to produce a figure of merit for programming, whereby programs receiving higher ratings can be assigned a higher priority. In a similar fashion, willing subscribers may be offered the opportunity to volunteer to participate in surveys of various kinds, with the added advantage that personal and preference data already available for each of the participants may be combined with the survey responses is useful ways. For example, the tendency to give a negative responses on a particular topic may be correlated with the age, sex, geographic location, etc. of the respondents. Subscribers who are participate in the surveys may be rewarded by providing reduced subscription rates, free programs, or cash payments.

As discussed previously in connection with FIG. 3 and 263–264, the embodiment which described also includes the capability of accepting comments from a subscriber at any time during the course of program playback. When such a comment is recorded, it is saved as separate file (or other identifiable data) together with the Program_ID of the program commented upon, the byte location within the playing program file where the comment or annotation is being made, a Class variable indicating the nature of the record, the Class variable being used as the Class variable in the Program_Segment record for the comment or annotation or comment, and the date and time of day when the comment is being created. When the comment is created, the user is then requested to specify, either by voice response or by a keyboard selection, whether the information to be recorded is to be treated as:

An annotation to be appended to the playing program record; or

1. A comment which is treated as an independent message/program segment.

The user further indicates the extent to which such an annotation or comment is to be made available to others. If designated as being public, annotations become available to any other subscriber who subsequently plays the program, at least to the extent that a given subscriber indicates that the playback of annotations is desired. Private annotations are simply stored in the user's local disk storage are (at 107 in FIG. 1) for future reference whereas public annotations are uploaded to the server where they are saved as separate files keyed to the original by means of the downloaded selections file for those subscribers who desire to hear annotations.

Comments are designated as being public or private messages. Public comments become independently available to all subscribers who have indicated an interest in the subject matter category(s) to which the comment relates. By default, a comment is assumed to relate to the same categories assigned to the program segment which was playing when the comment was produced, but these category codes may be changed by the user during the editing session (seen at 217 in FIG. 2). In addition to altering the subject matter codes for comments already dictated, the editing capabilities made available to the user at step 217 may advantageously include the ability to delete dictated comments so that they are not uploaded at all, direct comments to specific subscribers or email addresses, and enter new comments on any designated program segment in the current catalog by dictation or keyboarding.

In order to provide an appropriate program description for longer topics, whenever a user records a comment have a duration which exceeds a predetermined elapsed time, the player 103 performing the recording (at 264 in FIG. 3) produces an audio announcement requesting that the user dictate a brief summary of the comment which is used to form the topic description for the longer program segment. In the catalog listing provided to subscribers who desire access to comments as well as programs in a particular subject matter area, comments are listed in outline form as items which are subordinate to the parent program or comment to which they relate. The CommentOn field found in the Program_Segment record for each comment provides the information needed to display the hierarchical tree. The public comment mechanism contemplated by this aspect of the invention provides a useful facility which enables subscribers to exchange information with each other in special interest groups which function much like the UseNet groups on the Internet, but with a conversational ease and informality that audio recording makes possible.

A subscriber can elect the degree to which public comments or annotations are to played back along with programs or topics of specified interest. Comments or annotations can be excluded entirely, a link may be imbedded which may be executed at user request to play the comment or annotation at the point in the file where the comment or annotation was played, or all comments and annotations may be played immediately without first requesting user approval.

Private comments are not posted to the subject matter categories and are made available only to (1) the author of [specified by the Provider_ID of] the program segment being commented upon; (2) the host system, or a host system editor responsible for the subject matter area about which the comment is concerned; or (3) some other destination specified by the user. By sending comments to the author, the user can make a direct but private response to anything contained in a message or program created by that author. Particular advertisers or other content providers may encourage such comments and offer subscriber credits or other incentives to those who are willing to make comments.

The ability to send comments to the responsible host editor provides a direct mechanism by which a subscriber may express satisfaction or dissatisfaction about the programming content provided, suggest other programming which would be of interest, and the like. Moreover, the to-host comment provides a mechanism to assist the editors to identify subscribers who may be inappropriately injecting offensive material to the annoyance of other subscribers. In addition, questions about the operation of the system may be directed to the host, thereby providing help and customer support to subscribers who may need assistance. Finally, the host may provide additional services (fact finding, transaction processing, and the like) which are made available on a fee basis to interested subscribers.

Finally, the ability to direct comments to specific people allows the system to provide voice-mail like functions among subscribers. Using speech recognition, dictated comments may be translated into text messages that could be sent to anyone having an E-mail address or facsimile receiver. Alternatively, the comment could be transmitted as an audio file attachment to an E-mail message (e.g. as a RealAudio file). In addition, like private annotations, the comment may simply be placed on the user's local disk for future reference.

Comments and annotations are preferably stored on the player's local mass storage unit with header information designating a CommentON field (the Program_ID of the program segment commented on), the byte location in the playing program file where the comment was dictated, the Class field specifying the nature of the comment, and the Created date and time stamp. The files containing public and private annotations and comments (other than those designated for the sole use of the subscriber which remain on the local storage unit) are uploaded to the host at the same time the usage log is transferred (see 219, FIG. 2).

Defining Audio Programming with HTML

Narrative text to be presented in the interactive, multimedia format made possible by the present invention may be advantageously expressed in the first instance using essentially conventional hypertext markup language, "HTML". FIG. 7 shows an example of the content of a portion of an illustrative HTML text file indicated generally at 450 used to create an audio file seen at 460 and a selections file indicated at 470.

The HTML file illustrated at 450 uses conventional <IMG> tags to identify image files, conventional emphasizing tag pairs <EM> and </EM> to designate highlighted passages, and conventional <A> and </A> HTML tag pairs to designate the anchor text and link target of a hypertext link. Utilizing conventional HTML to describe the narrative content to be presented in audio form provides several significant advantages, not the least of which are:

conventional HTML composition software may be used to add the image and emphasis tags by means of visual tools which eliminate the need for hand-coding on a character level;

(a) a narrative text version of the audio programming may be viewed and printed, including both the emphasized text and the imbedded images, using most popular web browsers;

existing HTML files may be readily converted into audio multimedia presentations with little or no HTML editing being required;

HTML file may be made available from a server in a form which can be viewed in the normal way by any web browser yet and alternatively presented accordance with the invention in the form of an interactively browsable audio program with synchronized images;

the HTML file may be supplied along with the audio file as a transcript for the audio presentation, and to permit the audio presentation to be indexed and searched; and the HTML may be automatically converted into the combination of an audio file using conventional speech synthesis techniques to process the narrative text with the HTML tags being used to compile a selections file which enables the player to interactively browse the audio file using highlighted and linked passages, and to synchronize the image presentation with the audio file.

Figure 7:
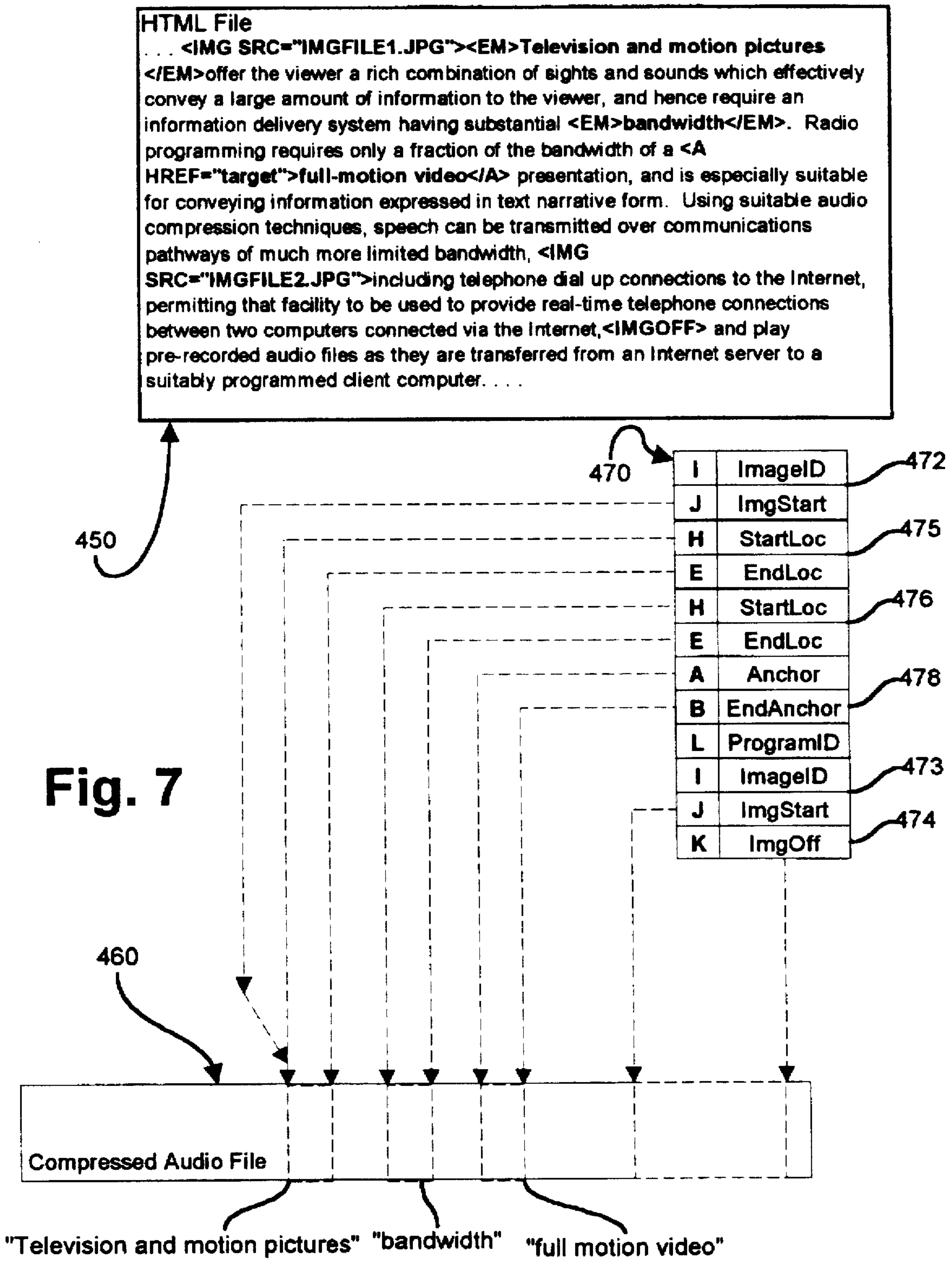
FIG. 7 is an information structure diagram illustrating the manner in which a narrative text file expressed in hypertext markup language (HTML) may be translated in to the combination of an audio speech file, a text file transcript, and a sequencing file used by the player to create a multimedia presentation.

As seen in FIG. 7, the HTML text passage seen at 450 begins with an image tag, <IMG SRC="IMGFILE1.JPG">, which to specify that the display of JPEG image in the file named "IMGFILE1.JPG" should begin at that point. The image tag is translated into a pair of "I" and "J" selection records seen at 472 which respectively contain the ImageID specifying IMGFILE1.JPG and the IMGSTART byte location in the audio file 460 where the display of that image is to begin. This display continues until the next <IMG> tag is encountered specifying the IMGFILE2.JPG image which creates the "I" and "J" selection record pair at 473. The <IMGOFF> is not standard HTML and hence would be ignored by conventional web browsers, but is inserted for recognition by the selections file compiler which responds by inserting the "K" record at 474 which specifies the point at which the current image display should end.

Immediately thereafter, the phrase "Television and motion pictures" is identified as a highlighted passage by the tag pair <EM> and </EM> seen in the text 450. These tags are translated into the "H" and "E" record pairs at 475 in the selections file 470 which identify the beginning and ending of the phrase in the audio file. As discussed earlier in conjunction with FIG. 5, the highlight markers in the selections file enable the player to play only the highlighted passages when in the highlight mode. A second "H" and "E" record pair seen at 476 is produced by the HTML text "<EM> bandwidth</EM>".

A conventional HTML hypertext anchor "<A HREF='target'> full motion video</A>" is processed to produce the three records "A", "B" and "L" at 478 in the selections file which respectively designate the beginning and ending of the anchor text passage and the location of a linked information. The "HREF='target'" portion of the HTML specifies the target location in conventional HTML and that symbolic address is then translated by the selections file compiler into the location within the selections file of the selections file record which refers to that target or, for targets in program segments which are not part of the currently scheduled programming defined by the selections file, by a negative number representing the negative of the ProgramID number of the target program segment.

The HTML forms mechanism may also be used to incorporate requests for user input at predetermined times during the playback of program segments. As described earlier in connection with FIG. 5, user inputs may take the form of recorded comments and annotations which are analogous to the <INPUT TYPE="text"> and the <TEXTAREA> tagged requests in an HTML form which similarly request the recipient to supply text data. In addition, the embodiment of the invention which has been described incorporates a mechanism for accepting "YES"/"NO" selections from a user which is analogous the HTML form <INPUT TYPE="checkbox"> tag. Similarly, the value choice mechanism using "V" selection records provides a radio-button-style mechanism for indicating a user's choice from among several options.

Standard HTML input tags include a Name attribute which can be used as an identifier for the data entered. As HTML is translated into an equivalent audio file, the tags in the written HTML are translated into records in the selections file which contain byte location values specifying when the player should pause the playback and accept the user response. The resulting uploaded usage log file (containing responses to radio and checkbox input tags) contains the response value together with the original byte location value from the selections file which serves the tag identifier. In order to facilitate processing of the responses, the HTML to audio conversion process may advantageously save a table correlating the Name values in the HTML source with the byte location values. In this way, the input tag Name parameter may be used as a symbolic identifier to identify and process response data.

The HTML input tag Value parameter is conventionally used to supply a default response value to be supplied when the user does not supply a different response. Value parameters may accordingly be saved for later use and inserted as output data when the user does not respond to the request for input (as indicated by the absence in the uploaded files of any response data containing the byte location value for the tag not responded to). In the same way, hidden HTML tags may be imbedded in the original HTML and saved during the HTML to audio conversion to indicate the correspondence between particular byte locations in the audio file and symbolic location names identified by the symbolic Name parameter specified in the hidden tag. Such hidden tags may be used, for example, to identify the beginning and end of particular passages and may be compared with the usage logs to determine the extent to which users exercised their option to skip the remainder of a program during the designated passage.

Conclusion

It is to be understood that the embodiment of the invention which has been described is merely illustrative of one application of the principles of the invention. Numerous modifications may be made to the specific structures and functions used in that embodiment without departing from the true spirit and scope of the invention.

What is claimed is:

1. A communications system for distributing audio recordings among a plurality of system subscriber stations located remotely from one another, said system comprising:

a communications network interconnecting said system subscribers, a subscriber access device connected to said network at each of said subscriber stations, said access device comprising:

playback means for reproducing a selected audio recording received from said network for a listener, input means for accepting a spoken message from said listener concurrently with the reproduction of said selected audio recording, means for recording said spoken message and identification data associating said spoken message with said selected audio recording to form a subscriber generated recording, and means for transmitting said subscriber generated recording over said network, and routing means coupled to said network and responsive to said identification data for transferring said subscriber generated recording to one or more of said subscribers.

2. A communications system as set forth in claim 1 wherein said spoken message is an audio annotation to be appended to said selected audio recording and wherein said identification data includes the specification of a chosen position in said selected audio recording to which said audio annotation relates.

3. A communications system as set forth in claim 2 wherein said input means includes means actuated by said listener for initiating the acceptance of said spoken message and wherein said chosen position is the position in said selected audio recording being reproduced when said acceptance was initiated by said listener.

4. A communications system as set forth in claim 2 wherein said routing means includes means for transferring said subscriber generated recording of said audio annotation to subscribers who thereafter receive transfers of said selected audio recording.

5. A communications system as set forth in claim 4 wherein said playback means includes means responsive the receipt of a subscriber generated recording of an audio annotation for playing said audio annotation when said position is reached during the playback of said selected audio recording.

6. A communications system as set forth in claim 1 wherein said identification data is indicative of at least one subject matter category and wherein said routing means includes:

means for storing data identifying a subset of subscribers having an interest in information within said one subject matter category, and means for transferring said subscriber generated recording to one or more of said subscribers in said subset.

7. A communications system as set forth in claim 6 wherein said at least one subject matter category is a subject matter category associated with said selected audio recording.

8. A communications system as set forth in claim 6 wherein said routing means for transferring said subscriber generated recording to said subscribers in said subset includes means responsive to preference data supplied by a receiving subscriber for encouraging or inhibiting the transfer of said subscriber generated recording to said receiving subscriber.

9. A communications system as set forth in claim 1 wherein said selected audio recording was produced by an originating subscriber and wherein said routing means includes means for transferring said subscriber generated recording as a response to said originating subscriber.

10. A communications system as set forth in claim 9 further including means for storing the identification of a subset of subscribers who have an interest in each of a plurality of subject matter topics, wherein said identification data further includes the specification of one or more subject matter topics to which said subscriber generated recordings relate, and further including means for transferring to those subscribers having an interest a given topic an identification of subscriber generated recordings which include the specification of said given topic.

11. Apparatus for exchanging information relating to a plurality of subject matter topics between a plurality of participants located remotely from one another, said apparatus comprising, in combination:

an electronic data communications network interconnecting said participants, one or more audio recording units coupled to said network for recording audio messages spoken by each of said participants, means for persistently storing each given one of said audio messages with identification data designating one or more of said subject matter topics to which said given audio message relates, means for providing to a requesting participant an identification of previously stored messages relating to a subject matter topic specified in a request for information, and an audio playback unit for reproducing stored messages specified in said identification.

12. Apparatus as set forth in claim 11 wherein each of said audio recording units includes means operable by a participant for recording a comment relating to a particular previously stored message wherein the identification data stored with said comment designates one or more of the subject matter topics to which said previously stored message relates.

13. Apparatus as set forth in claim 12 further including:

means for persistently storing pre-recorded programs each of which relates to one or more of said subject matter topics, and means for additionally providing a requesting participant an identification of pre-recorded programs relating to a subject matter topic specified in a request for information.

14. Apparatus for obtaining information responsive to request for information request which comprises, in combination, means for recording said request for information as an audio recording containing a spoken request prompt and a recorded request marker specifying a position in said audio recording subsequent to said request prompt, playback means for reproducing said spoken request prompt for a listener, input means initiated by said recorded request marker for temporarily suspending the operation of said playback means while accepting a spoken response from said listener, and recording means for storing said spoken response together with identification data designating said request.

15. Apparatus as set forth in claim 14 wherein said identification data comprises a designation of said audio recording and a designation of the position of said request marker in said audio recording.

16. Apparatus as set forth in claim 14 wherein said input means further comprises means actuated by said listener for initiating the acceptance of a spoken message and wherein said recording means further comprises means for storing said spoken message together with a designation of said audio recording and a designation of the position in said audio recording at which the acceptance of said spoken message was initiated by said listener.

17. A method for producing and processing an audio questionnaire comprising, in combination, the steps of:

storing an electronically readable file of text characters consisting of natural language text and at least one response request marker indicating a position relative to said natural language text where a response is to be inserted by a human listener, using speech synthesis processing to convert said electronically readable file of text characters into a corresponding audio file of spoken natural language, converting said response request marker in said file of text characters into timing data indicating said position in said audio file, reproducing said audio file for said human listener, temporarily suspending the reproduction of said audio file at said position in said audio file indicated by said timing data, and accepting and recording a spoken response from said listener while said reproduction is temporarily suspended.

18. A method as set forth in claim 17 for producing and processing an audio questionnaire wherein said response request marker further specifies a selected one of a group of predetermined response types.

19. A method as set forth in claim 18 wherein said a group of predetermined response types includes a spoken response recorded stored as an audio recording and a spoken response recorded as a one a predetermined set of data values.

* * * * *